US009719691B2

(12) United States Patent
Takenaka et al.

(10) Patent No.: US 9,719,691 B2
(45) Date of Patent: Aug. 1, 2017

(54) AIR-CONDITIONING APPARATUS

(75) Inventors: Naofumi Takenaka, Chiyoda-ku (JP);
Shinichi Wakamoto, Chiyoda-ku (JP);
Osamu Morimoto, Chiyoda-ku (JP);
Daisuke Shimamoto, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 558 days.

(21) Appl. No.: 14/351,428

(22) PCT Filed: Jan. 5, 2012

(86) PCT No.: PCT/JP2012/000041
§ 371 (c)(1),
(2), (4) Date: Apr. 11, 2014

(87) PCT Pub. No.: WO2013/102953
PCT Pub. Date: Jul. 11, 2013

(65) Prior Publication Data
US 2014/0260387 A1  Sep. 18, 2014

(51) Int. Cl.
*F24F 11/02* (2006.01)
*F24F 3/06* (2006.01)
(Continued)

(52) U.S. Cl.
CPC .......... *F24F 11/022* (2013.01); *F24F 3/065* (2013.01); *F24F 11/008* (2013.01); *F25B 13/00* (2013.01);
(Continued)

(58) Field of Classification Search
CPC .............. F25B 13/00; F25B 2313/0314; F25B 2313/0231; F25B 2313/02741;
(Continued)

(56) References Cited

U.S. PATENT DOCUMENTS 5,297,392 A * 3/1994 Takata ................. F24F 3/065
236/49.3
9,366,452 B2 * 6/2016 Takenaka ................. F24F 3/06
(Continued)

FOREIGN PATENT DOCUMENTS

CN 102016450 A 4/2011
JP 4-6374 1/1992
(Continued)

OTHER PUBLICATIONS

Nelson, Eric, "Refrigeration Basics 101", Jun. 5, 2010.*
(Continued)

*Primary Examiner* — Frantz Jules
*Assistant Examiner* — Schyler S Sanks
(74) *Attorney, Agent, or Firm* — Oblon, McClelland, Maier & Neustadt, L.L.P.

(57) ABSTRACT

When indoor units are performing a cooling operation, an air-conditioning apparatus controls four flow passage switching valves, for example a first solenoid valve, a second solenoid valve, a third solenoid valve, and a fourth solenoid valve, so that a number of intermediate heat exchangers operating as evaporators is greater than in a cooling main operation. During the cooling main operation, a target value for suction pressure or evaporating temperature at a compressor is set equal to or lower than that in a case in which the indoor units are performing the cooling operation, and a frequency of the compressor and a capacity of a heat-source-side heat exchanger are controlled.

16 Claims, 8 Drawing Sheets

(51) Int. Cl.
  *F24F 11/00* (2006.01)
  *F25B 13/00* (2006.01)
  *F25B 25/00* (2006.01)

(52) U.S. Cl.
  CPC ....... *F25B 25/005* (2013.01); *F25B 2313/003* (2013.01); *F25B 2313/0231* (2013.01); *F25B 2313/0272* (2013.01); *F25B 2600/0253* (2013.01); *Y02B 30/741* (2013.01)

(58) Field of Classification Search
  CPC .......... F25B 2313/006; F25B 2313/007; F25B 2313/023; F25B 2700/1933; F25B 2700/1931; F25B 2700/21151; F25B 2700/2104; F25B 25/005; F25B 49/022; F25B 49/025; F25B 2600/13; F25B 2600/021; F25B 2600/0253; F25B 7/00; F25B 2700/21161; F25B 2700/21171; F25B 2600/111; F25B 2600/025; F25B 2600/11; F25B 2600/0271; F25B 2600/0272; F24F 3/065; F24F 11/001; Y02B 30/741
  USPC .......................... 60/228.4; 62/181, 183, 159
  See application file for complete search history.

(56) References Cited

U.S. PATENT DOCUMENTS

| | | |
|---|---|---|
| 2011/0088421 A1 | 4/2011 | Wakamoto et al. |
| 2011/0197608 A1 | 8/2011 | Yamashita et al. |
| 2011/0225998 A1* | 9/2011 | Yamashita .............. F24F 3/065 62/126 |
| 2011/0232308 A1 | 9/2011 | Morimoto et al. |
| 2012/0174611 A1* | 7/2012 | Yamashita .............. F24F 3/065 62/204 |

FOREIGN PATENT DOCUMENTS

| | | | |
|---|---|---|---|
| JP | 5-10619 | 1/1993 | |
| JP | 2007-147203 | 6/2007 | |
| WO | 2010/050003 A1 | 5/2010 | |
| WO | 2010/050006 A1 | 5/2010 | |
| WO | WO 2010/050000 A1 | 5/2010 | |
| WO | WO 2010050000 A1 * | 5/2010 | .............. F24F 3/065 |
| WO | WO 2010/131378 A1 | 11/2010 | |
| WO | WO 2010131378 A1 * | 11/2010 | ................ F24F 3/06 |
| WO | WO 2011052040 A1 * | 5/2011 | .............. F24F 3/065 |
| WO | 2011/080805 A1 | 7/2011 | |
| WO | 2011/089637 A1 | 7/2011 | |

OTHER PUBLICATIONS

International Search Report issued Apr. 17, 2012, in PCT/JP12/000041 filed Jan. 5, 2012.

Combined Chinese Office Action and Search Report issued Dec. 30, 2015 in Patent Application No. 201280059769.X (with English language translation and English translation of categories of cited documents).

Extended European Search Report issued on Sep. 15, 2015 in European Patent Application No. 12864165.1.

* cited by examiner

AIR-CONDITIONING APPARATUS

TECHNICAL FIELD

The present invention relates to an air-conditioning apparatus using a refrigeration cycle and, more particularly, to an air-conditioning apparatus that performs heat transport of cooling energy or heating energy generated in a refrigeration cycle to a use-side heat exchanger using a different heat medium.

BACKGROUND ART

A cooling and heating simultaneous air-conditioning apparatus in which a relay unit and a plurality of indoor units are connected to an outdoor unit and which is capable of performing a cooling operation in which the operation mode of an operating indoor unit is cooling only, a heating operation in which the operation mode of an operating indoor unit is heating only, and a mixed (simultaneous) operation in which indoor units perform cooling and heating, is available (see, for example, Patent Literatures 1 to 3).

Patent Literature 1 describes a method for controlling the compressor frequency of the cooling and heating simultaneous air-conditioning apparatus and the heat exchange capacity of an outdoor heat exchanger.

Furthermore, Patent Literatures 2 and 3 describe a system in which an intermediate heat exchanger is provided in a relay unit and which performs a cooling and heating simultaneous operation in which heat transport from an outdoor unit to the relay unit is performed using a refrigerant, heat exchange between the refrigerant and brine in a refrigeration cycle is performed in the intermediate heat exchanger, and heat transport from the relay unit to an indoor unit is performed using the brine, and a control method on the water side.

CITATION LIST

Patent Literatures

Patent Literature 1: Japanese Unexamined Patent Application Publication No. 4-6374 (FIG. 1)

Patent Literature 2: PCT International Publication No. WO10/131378 (FIG. 12)

Patent Literature 3: PCT International Publication No. WO10-050000 (FIG. 3)

SUMMARY OF INVENTION

Technical Problem

In the cooling and heating simultaneous air-conditioning apparatus described in Patent Literature 1, a method for controlling the condensing temperature and the evaporating temperature of the refrigerant in the compressor and the indoor unit at predetermined target values in order to exhibit a capacity corresponding to the load of the indoor unit is described.

In contrast, in the air-conditioning apparatus described in Patent Literatures 2 and 3, typically, the number of installed intermediate heat exchangers is smaller than the number of connected indoor units. Thus, the heat exchange capacity of the intermediate heat exchangers cannot be changed continuously upon ON or OFF of cooling and heating of the indoor units. This poses a problem that even when the condensing temperature and the evaporating temperature are controlled at predetermined values, the cooling and heating capacities may vary depending on the load and the operation modes of the indoor units.

The present invention has been made to solve the above-mentioned problem, and has as its object to provide an air-conditioning apparatus which maintains cooling and heating capacities even when the load conditions vary and which is capable of operating in a state where the cycle efficiency is high.

Solution to Problem

An air-conditioning apparatus according to the present invention includes a heat source unit including a compressor, a first flow passage switching valve that switches a flow passage of a first refrigerant, and a heat-source-side heat exchanger; a plurality of indoor units each including a use-side heat exchanger; and a relay unit including a plurality of intermediate heat exchangers, second flow passage switching valves that switch operation of the indoor units between heating and cooling, and third flow passage switching valves that switch connection of the intermediate heat exchangers between a condenser and an evaporator. In the air-conditioning apparatus, a primary-side cycle is formed through which a primary-side heat transfer medium circulates between the heat source unit and the relay unit, a secondary-side cycle is formed through which a secondary-side heat transfer medium circulates between the relay unit and the indoor units, and heat exchange is performed between the primary-side cycle and the secondary-side cycle in the intermediate heat exchangers. When all of operating indoor units out of the plurality of indoor units are performing a cooling operation, the third flow passage switching valves are controlled such that the number of the intermediate heat exchangers operating as evaporators is greater than in a cooling main operation in which the indoor unit performing cooling and the indoor unit performing heating exist at the same time and the first flow passage switching valve is controlled so that the heat-source-side heat exchanger operates by being connected to a discharge side of the compressor. During the cooling main operation, a target value for a suction pressure or an evaporating temperature at the compressor is set equal to or lower than a case where all of the operating indoor units are performing the cooling operation, and a frequency of the compressor and a capacity of the heat-source-side heat exchanger are controlled.

An air-conditioning apparatus according to the present invention includes a heat source unit including a compressor, a first flow passage switching valve that switches a flow passage of a first refrigerant, and a heat-source-side heat exchanger; a plurality of indoor units each including a use-side heat exchanger; and a relay unit including a plurality of intermediate heat exchangers, second flow passage switching valves that switch operation of the indoor units between heating and cooling, and third flow passage switching valves that switch connection of the intermediate heat exchangers between a condenser and an evaporator. In the air-conditioning apparatus, a primary-side cycle is formed through which a primary-side heat transfer medium circulates between the heat source unit and the relay unit, a secondary-side cycle is formed through which a secondary-side heat transfer medium circulates between the relay unit and the indoor units, and heat exchange is performed between the primary-side cycle and the secondary-side cycle in the intermediate heat exchangers. When all of operating indoor units out of the plurality of indoor units are performing a heating operation, the third flow passage switching valves are controlled such that the number of the intermediate heat exchangers operating as condensers is greater than in a heating main operation in which the indoor unit performing cooling and the indoor unit performing heating exist at the same time and the first flow passage switching valve is controlled so that the heat-source-side heat exchanger operates by being connected to a suction side of the compressor. During the heating main operation, a target value for a discharge pressure or a condensing temperature at the compressor is set equal to or higher than a case where all of the operating indoor units are performing the heating operation, and a frequency of the compressor and a capacity of the heat-source-side heat exchanger are controlled.

Advantageous Effects of Invention

In an air-conditioning apparatus according to the present invention, even when the load conditions vary, cooling and heating capacities are maintained, and operation can be performed in a state where the cycle efficiency, such as COP, is high.

DESCRIPTION OF EMBODIMENTS

Embodiments of the present invention will be described hereinafter with reference to the accompanying drawings.
Embodiment 1

Figure 1:
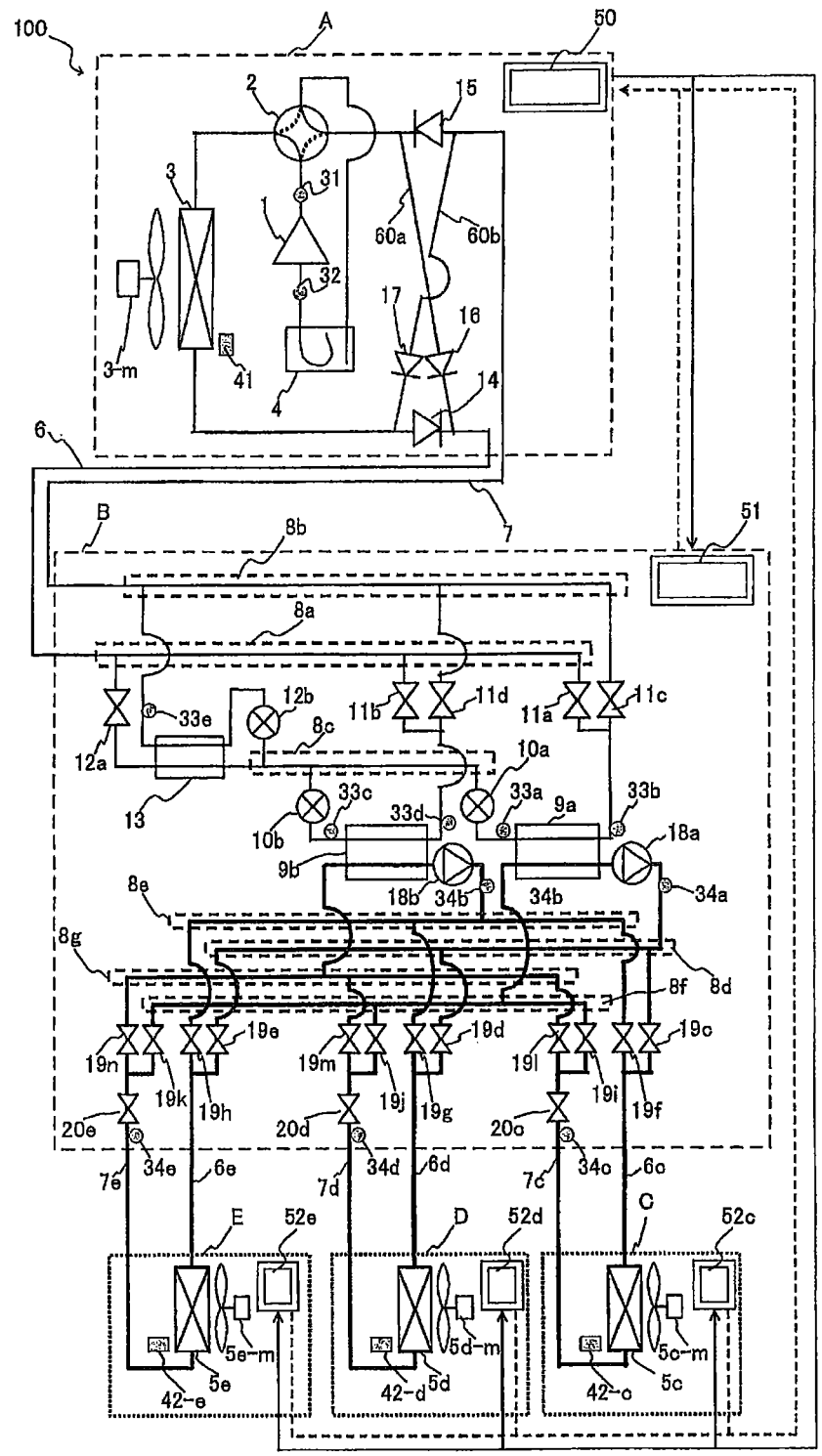
FIG. 1 is a refrigerant circuit diagram illustrating an example of the refrigerant circuit configuration of an air-conditioning apparatus according to Embodiment 1 of the present invention.
Figure 2:
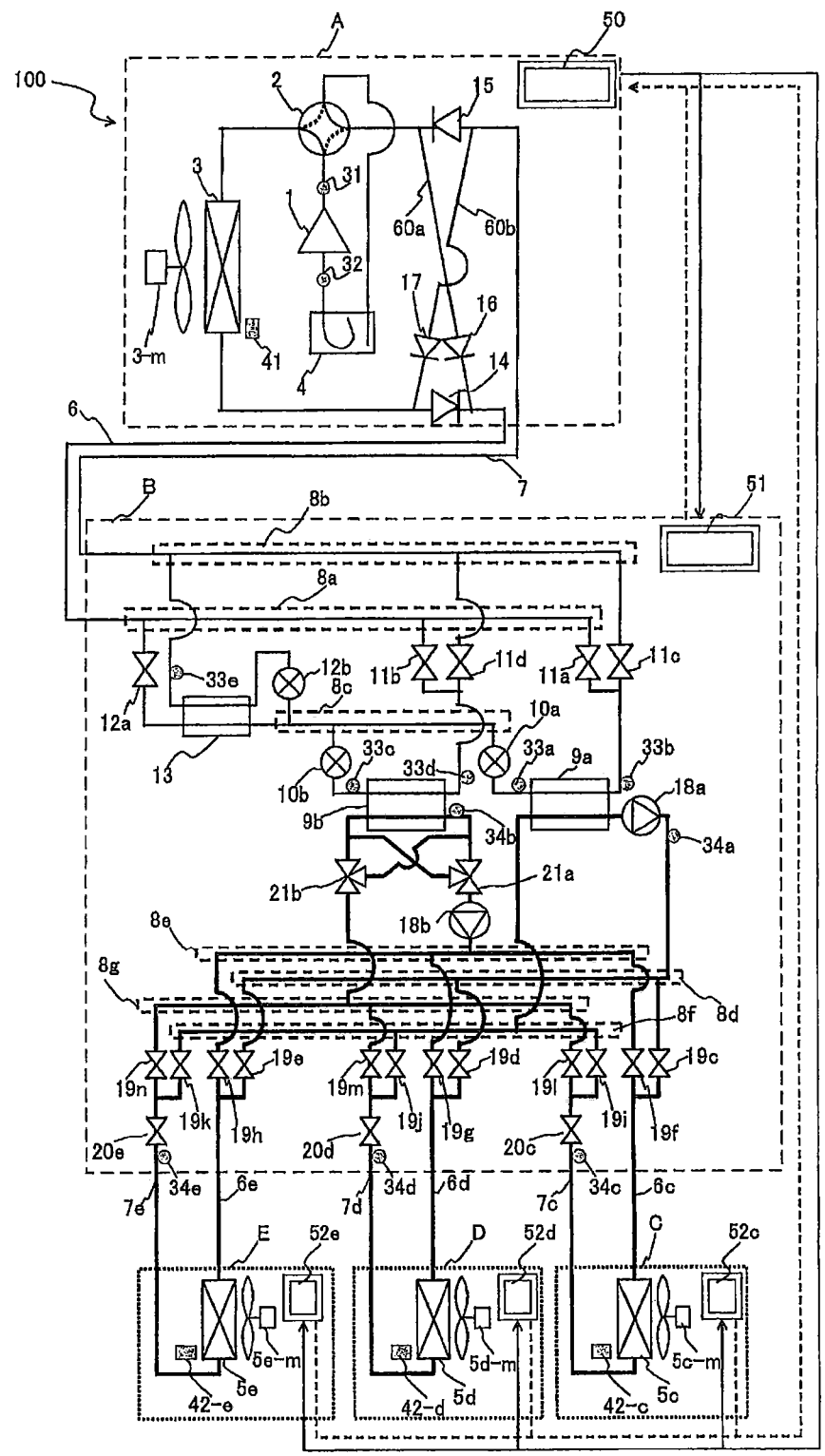
FIG. 2 is a refrigerant circuit diagram illustrating another example of the refrigerant circuit configuration of the air-conditioning apparatus according to Embodiment 1 of the present invention.

FIG. 1 is a refrigerant circuit diagram illustrating an example of the refrigerant circuit configuration of an air-conditioning apparatus 100 according to Embodiment 1 of the present invention. FIG. 2 is a refrigerant circuit diagram illustrating another example of the refrigerant circuit configuration of the air-conditioning apparatus 100 according to Embodiment 1 of the present invention. The circuit configuration and operation of the air-conditioning apparatus 100 will be explained with reference to FIGS. 1 and 2. The air-conditioning apparatus allows each indoor unit to freely select a cooling mode or a heating mode using a refrigeration cycle. In the drawings provided below including FIG. 1, the size relationship of individual components may be different from the actual size relationship.

In FIG. 1, the air-conditioning apparatus 100 includes a heat source unit (outdoor unit) A, a plurality of indoor units C to E connected in parallel, and a relay unit B interposed between the heat source unit A and the indoor units C to E. In Embodiment 1, the case where one relay unit and three indoor units are connected to one heat source unit will be explained. However, the illustration is not intended to limit the number of the units connected. For example, two or more heat source units, two or more relay units, and two or more indoor units may be connected.

Furthermore, the number of operating indoor units connected to the relay unit B may be larger than the number of intermediate heat exchangers within the relay unit B, which will be described later, and even when the number of installed intermediate heat exchangers is equal to the number of connected indoor units, the variation range of the capacity of the intermediate heat exchangers may be different from the variation range of the capacity of the indoor units. This represents, for example, the case in which two intermediate heat exchangers are mounted in the relay unit B, two indoor units are connected to the relay unit B, the heat exchange capacities of the two intermediate heat exchangers are the same, and the capacities of the two indoor units are different. However, Embodiment 1 assumes that the capacities of the indoor units C to E are the same and the capacities of the two intermediate heat exchangers are the same.

A primary-side cycle through which a primary-side heat transfer medium (referred to as refrigerant, hereinafter) circulates is formed between the heat source unit A and the relay unit B, a secondary-side cycle through which a secondary-side heat transfer medium (referred to as brine, hereinafter) circulates is formed between the relay unit B and each of the indoor units C to E, and heat exchange between the primary-side cycle and the secondary-side cycle is performed in intermediate heat exchangers 9a and 9b arranged within the relay unit B. That is, in the air-conditioning apparatus 100, cooling energy and heating energy generated by the heat source unit A are transferred to the indoor units C to E via the intermediate heat exchangers 9a and 9b of the relay unit B.

As the refrigerant, a refrigerant used in a vapor-compression heat pump, such as a fluorocarbon refrigerant (for example, an HFC-type refrigerant, such as an R32 refrigerant, R125, or R134a, a mixture of the above refrigerants, such as R410A, R407c, R404A, or the like), an HFO refrigerant (for example, HFO-1234yf, HFO-1234ze(E), or HFO-1234ze(Z)), a $CO_2$ refrigerant, an HC refrigerant (for example, propane or isobutane refrigerant), an ammonia refrigerant, or a mixed refrigerant of the above refrigerants, such as a mixed refrigerant of R32 and HFO-1234yf, may be used. Furthermore, as the brine, water, antifreeze, or water containing an anti-corrosion material as an additive may be used.

[Heat Source Unit A]

The heat source unit A is typically positioned in a space outside a construction, such as a building (for example, a rooftop or the like), and supplies cooling energy or heating energy to the indoor units C to E via the relay unit B. However, the heat source unit A need not be installed outdoors. For example, the heat source unit A may be installed in an enclosed space, such as a machine room equipped with an ventilation opening. The heat source unit A may be installed inside a construction as long as waste heat can be exhausted outside the construction via an exhaust duct. Alternatively, a heat source unit A of a water-cooled type may be installed inside a construction. The area in which the heat source unit A is installed is irrelevant to any particular problem involved.

The heat source unit A includes a compressor 1, a four-way valve 2, which serves as a first flow passage switching valve that switches the direction in which a refrigerant circulates, a heat-source-side heat exchanger 3, and an accumulator 4. The above-mentioned components are connected by a first refrigerant pipe 6 and a second refrigerant pipe 7. In the vicinity of the heat-source-side heat exchanger 3, a flow control device 3-$m$ for controlling the flow rate of fluid that exchanges heat with a refrigerant is installed. Hereinafter, a heat-source-side heat exchanger 3 of an air-cooled type will be explained as an example of the heat-source-side heat exchanger 3 and a fan 3-$m$ will be explained as an example of the flow control device 3-$m$. However, a heat-source-side heat exchanger 3 of another type, such as a water-cooled type (in this case, the flow control device 3-$m$ is a pump), may be used as long as a refrigerant exchanges heat with another fluid. A method for controlling the compressor 1 and the fan 3-$m$, and a method for switching the four-way valve 2 will be described later.

The heat source unit A also includes a first connecting pipe 60A, a second connecting pipe 60B, a check valve 14, a check valve 16, a check valve 17, and a check valve 15. By providing the first connecting pipe 60A, the second connecting pipe 60B, the check valve 14, the check valve 16, the check valve 17, and the check valve 15, a high-pressure refrigerant flows out of the heat source unit A via the first refrigerant pipe 6 and a low-pressure refrigerant flows into the heat source unit A via the second refrigerant pipe 7, regardless of the direction in which the four-way valve 2 is connected.

The compressor 1 sucks a heat-source-side refrigerant and compresses the heat-source-side refrigerant into a high-temperature and high-pressure state, and is desirably configured as, for example, a capacity-controllable inverter compressor or the like. The four-way valve 2 switches between the flow of the heat-source-side refrigerant at the time of a heating operation (in a heating only operation mode and a heating main operation mode) and the flow of the heat-source-side refrigerant at the time of a cooling operation (in a cooling only operation mode and a cooling main operation mode). The heat-source-side heat exchanger (outdoor heat exchanger) 3 functions as an evaporator during a heating operation while functioning as a condenser (or a radiator) during a cooling operation, exchanges heat between air supplied from the fan 3-$m$ and the heat-source-side refrigerant, and transforms the heat-source-side refrigerant into vapor or condensate according to the circumstances involved. The accumulator 4 is provided on the suction side of the compressor 1, and stores an excess refrigerant generated due to the difference between a heating operation and a cooling operation or an excess refrigerant generated due to a transient change in operation.

The check valve 14 is provided at the first refrigerant pipe 6 between the heat-source-side heat exchanger 3 and the relay unit B, and allows the heat-source-side refrigerant to flow only in a predetermined direction (the direction from the heat source unit A to the relay unit B). The check valve 15 is provided at the second refrigerant pipe 7 between the relay unit B and the four-way valve 2, and allows the heat-source-side refrigerant to flow only in another predetermined direction (the direction from the relay unit B to the heat source unit A). The check valve 16 is provided at the first connecting pipe 60$a$, and causes the heat-source-side refrigerant discharged from the compressor 1 to circulate to the relay unit B during a heating operation. The check valve 17 is provided at the connecting pipe 60$b$, and causes the heat-source-side refrigerant returned from the relay unit B to circulate to the suction side of the compressor 1 during a heating operation.

The first connecting pipe 60$a$ connects between the second refrigerant pipe 7 between the four-way valve 2 and the check valve 15, and the first refrigerant pipe 6 between the check valve 14 and the relay unit B, within the heat source unit A. The second connecting pipe 60$b$ connects between the second refrigerant pipe 7 between the check valve 15 and the relay unit B, and the first refrigerant pipe 6 between the heat-source-side heat exchanger 3 and the check valve 14, within the heat source unit A.

The heat source unit A moreover includes a pressure gauge 31, a pressure gauge 32, and a thermometer 41. The pressure gauge 31 is provided on the discharge side of the compressor 1 and measures the pressure of the refrigerant discharged from the compressor 1. The pressure gauge 32 is provided on the suction side of the compressor 1 and measures the pressure of the refrigerant sucked into the compressor 1. The thermometer 41 is provided in the vicinity of the heat-source-side heat exchanger 3 and measures the temperature of the outside air taken in by the fan 3-$m$. The pieces of information (temperature information and pressure information) detected by the above-mentioned detection devices are sent to a controller (for example, control means 50) that performs overall control of the operation of the air-conditioning apparatus 100, and are used to control each actuator.

[Relay Unit B]

The relay unit B is installed in, for example, a space on, for example, the lower side of the roof, which is formed inside a construction but is different from an indoor space, and transfers, to the indoor units C to E, cooling energy or heating energy supplied from the heat source unit A. However, the relay unit B may be installed in a shared space in which an elevator or the like is installed, or the like.

As branch portions on the refrigerant side, the relay unit B includes a first branch portion 8$a$ into which a high-pressure refrigerant flows from the heat source unit A, a second branch portion 8$b$ from which a low-pressure refrigerant flows out towards the heat source unit A, and a third branch portion 8$c$ in which the refrigerant has an intermediate pressure. Furthermore, as branch portions on the brine side, the relay unit B includes a fourth branch portion 8$d$ and a fifth branch portion 8$e$ corresponding to the high-pressure side of brine, and a sixth branch portion 8$f$ and a seventh branch portion 8$g$ corresponding to the low-pressure side of brine.

Furthermore, the relay unit B includes the first intermediate heat exchanger 9$a$ and the second intermediate heat exchanger 9$b$ which exchange heat between a refrigerant and a second refrigerant, a first pump 18$a$ and a second pump 18$b$ which drive the second refrigerant, a first flow control device 10a which controls the flow rate of the refrigerant, a second flow control device 10b which controls the flow rate of the refrigerant, a third flow control device 12a which controls the flow rate of the refrigerant, a fourth flow control device 12b which controls the flow rate of the refrigerant, and a refrigerant-refrigerant heat exchanger 13 which exchanges heat between refrigerants.

At the first branch portion 8a, the first refrigerant pipe 6 is branched in order to connect the first refrigerant pipe 6 to each of the intermediate heat exchangers 9a and 9b. At the second branch portion 8b, the second refrigerant pipe 7 is branched in order to connect the second refrigerant pipe 7 to each of the intermediate heat exchangers 9a and 9b. The third branch portion 8c is provided between the first flow control device 10a and the second flow control device 10b, and the third flow control device 12a and the fourth flow control device 12b, and connects the intermediate heat exchangers 9a and 9b in series or in parallel.

A first solenoid valve 11a is provided at the pipe between the first branch portion 8a and the intermediate heat exchanger 9a. A second solenoid valve 11b is provided at the pipe between the first branch portion 8a and the intermediate heat exchanger 9b. A third solenoid valve 11c is provided at the pipe between the second branch portion 8b and the intermediate heat exchanger 9a. A fourth solenoid valve 11d is provided at the pipe between the second branch portion 8b and the intermediate heat exchanger 9b. The first solenoid valve 11a, the second solenoid valve 11b, the third solenoid valve 11c, and the fourth solenoid valve 11d each operate as a third flow passage switching valve for selectively switching the connection of the intermediate heat exchanger 9a or 9b between a condenser and an evaporator, and each allow the intermediate heat exchanger 9a or 9b to be switchably connected to the first branch portion 8a or the second branch portion 8b.

The first solenoid valve 11a and the third solenoid valve 11c are installed on a side opposite to the side of the first flow control device 10a with respect to the intermediate heat exchanger 9a. Furthermore, the second solenoid valve 11b and the fourth solenoid valve 11d are installed on a side opposite to the side of the second flow control device 10b with respect to the intermediate heat exchanger 9b. The flow of refrigerant in the intermediate heat exchangers 9a and 9b will be explained later in [Circuit Configuration].

The fourth branch portion 8d branches the brine that has flowed out of the intermediate heat exchanger 9a into the first brine pipes 6c, 6d, and 6e. The fifth branch portion 8e branches the brine that has flowed out of the intermediate heat exchanger 9b into the first brine pipes 6c, 6d and 6e. The sixth branch portion 8f combines the brines that have flowed through the second brine pipes 7c, 7d and 7e together, and allows the combined brine to flow into the intermediate heat exchanger 9a. The seventh branch portion 8g combines the brines that have flowed through the second brine pipes 7c, 7d and 7e together, and allows the combined brine to flow into the intermediate heat exchanger 9b.

A switching valve 19c is installed at the first brine pipe 6c between the fourth branch portion 8d and an indoor heat exchanger (use-side heat exchanger) 5c. A switching valve 19d is installed at the first brine pipe 6d between the fourth branch portion 8d and an indoor heat exchanger 5d. A switching valve 19e is installed at the first brine pipe 6e between the fourth branch portion 8d and an indoor heat exchanger 5e. A switching valve 19f is installed at the first brine pipe 6c between the fifth branch portion 8e and the indoor heat exchanger 5c. A switching valve 19g is installed at the first brine pipe 6d between the fifth branch portion 8e and the indoor heat exchanger 5d. A switching valve 19h is installed at the first brine pipe 6e between the fifth branch portion 8e and the indoor heat exchanger 5e.

The switching valves 19c, 19d, 19e, 19f, 19g, and 19h operate as second flow passage switching valves that switch the flow passage of brine, and allow the indoor units C to E to be switchably connected to the fourth branch portion 8d or the fifth branch portion 8e.

A switching valve 19i is installed at the second brine pipe 7c between the sixth branch portion 8f and the indoor heat exchanger 5c. A switching valve 19j is installed at the second brine pipe 7d between the sixth branch portion 8f and the indoor heat exchanger 5d. A switching valve 19k is installed at the second brine pipe 7e between the sixth branch portion 8f and the indoor heat exchanger 5e. A switching valve 19l is installed at the second brine pipe 7c between the seventh branch portion 8g and the indoor heat exchanger 5c. A switching valve 19m is installed at the second brine pipe 7d between the seventh branch portion 8g and the indoor heat exchanger 5d. A switching valve 19n is installed at the second brine pipe 7e between the seventh branch portion 8g and the indoor heat exchanger 5e.

The switching valves 19i, 19j, 19k, 19l, 19m, and 19n operate as second flow passage switching valves which switch the flow passage of brine, and allow the indoor units C to E to be switchably connected to the sixth branch portion 8f or the seventh branch portion 8g.

In Embodiment 1, the case in which two sets of intermediate heat exchangers, flow control devices, and pumps are installed will be exemplified. However, the number of the components installed is not limited to that as illustrated. That is, the air-conditioning apparatus 100 includes a plurality of intermediate heat exchangers installed to be capable of a cooling and heating simultaneous operation. As the number of sets of intermediate heat exchangers, flow control devices, and pumps increases, the heat exchange capacities for cooling and heating of the intermediate heat exchangers can be stably, continuously switched according to the load of an indoor unit.

The relay unit B includes thermometers 33a to 33d that measure the temperatures of refrigerant at the inlets and outlets of the intermediate heat exchangers 9a and 9b, a thermometer 33e that measures the temperature of refrigerant between the refrigerant-refrigerant heat exchanger 13 and the second branch portion 8b, thermometers 34a and 34b that measure the temperatures of brine on the downstream sides of the first pump 18a and the second pump 18b, respectively, and thermometers 34c to 34e that measure the temperatures of brine between the indoor heat exchangers 5c to 5e and flow control devices 20c to 20e, respectively. The pieces of information (temperature information) detected by the above-mentioned detection devices are sent to a controller (for example, control means 51) that performs overall control of the operation of the air-conditioning apparatus 100, and are used to control each actuator.

[Indoor Units C to E]

The indoor units C to E are each installed at a position from which conditioned air can be supplied to an air-conditioning target space, such as an indoor space, and each supply cooling air or heating air to the air-conditioning target space using cooling energy or heating energy from the heat source unit A transferred via the relay unit B.

The indoor heat exchanger 5 is mounted in each of the indoor units C to E. Reference symbols c to e are assigned to the indoor heat exchangers 5 in correspondence with the indoor units C to E, respectively. The indoor heat exchanger 5c is connected to the sixth branch portion 8f or the seventh branch portion 8g of the relay unit B via the second brine pipe 7c, and is connected to the fourth branch portion 8d or the fifth branch portion 8e of the relay unit B via the first brine pipe 6c. The indoor heat exchanger 5d is connected to the sixth branch portion 8f or the seventh branch portion 8g of the relay unit B via the second brine pipe 7d, and is connected to the fourth branch portion 8d or the fifth branch portion 8e of the relay unit B via the first brine pipe 6d. The indoor heat exchanger 5e is connected to the sixth branch portion 8f or the seventh branch portion 8g of the relay unit B via the second brine pipe 7e, and is connected to the fourth branch portion 8d or the fifth branch portion 8e of the relay unit B via the first brine pipe 6e.

The indoor heat exchangers 5 each exchange heat between air supplied from an air-sending device of a fan 5-m and a heat medium, and generate heating air or cooling air to be supplied to the air-conditioning target space. Furthermore, in the vicinity of each of the indoor heat exchangers 5, a flow control device 5-m that controls the flow rate of fluid that exchanges heat with refrigerant is installed. Hereinafter, indoor heat exchangers 5 of an air-cooled type will be taken as an example of the indoor heat exchangers 5, and fans 5-m will be taken as an example of the flow control devices 5-m. However, indoor heat exchangers 5 of a different type, such as a water-cooled type (in this case, the flow control devices 5-m are pumps), may be used as long as refrigerant exchanges heat with another fluid. Reference symbols c to e are assigned to the fans 5-m in correspondence with the indoor units C to E, respectively.

Thermometers 42-c to 42-e that measure the current temperatures of air-conditioning target spaces, such as indoor spaces, are provided in the indoor units C to E, respectively. The pieces of information (temperature information) detected by these detection devices are sent to controllers (for example, control means 52c, 52d, and 52e) that perform overall control of the operation of the air-conditioning apparatus 100, and are used to control each actuator.

[Pipes]

A narrow pipe that connects between the heat-source-side heat exchanger 3 and the first branch portion 8a of the relay unit B is referred to as the first refrigerant pipe 6. Pipes that connect between the indoor heat exchangers 5c, 5d, and 5e of the indoor units C, D, and E and the fourth branch portion 8d or the fifth branch portion 8e of the relay unit B are referred to as the first brine pipes 6c, 6d, and 6e. The first brine pipes 6c, 6d, and 6e correspond to the first refrigerant pipe 6.

A pipe that has a width larger than that of the first refrigerant pipe 6 and connects between the four-way valve 2 and the second branch portion 8b of the relay unit B is referred to as the second refrigerant pipe 7. Pipes that connect between the indoor heat exchangers 5c, 5d, and 5e of the indoor units C, D, and E and the sixth branch portion 8f or the seventh branch portion 8g of the relay unit B are referred to as the second brine pipes 7c, 7d, and 7e. The second brine pipes 7c, 7d, and 7e correspond to the second refrigerant pipe 7.

Accordingly, the refrigerant flows from the heat source unit A to the relay unit B in the first refrigerant pipe 6 and flows from the relay unit B to the heat source unit A in the second refrigerant pipe 7. Furthermore, brine, serving as the second refrigerant, flows from the relay unit B to the indoor units C to E in the first brine pipes 6c to 6e, respectively, and flows from the indoor units C to E to the relay unit B in the second brine pipes 7c to 7e, respectively.

[Circuit Configuration]

The circuit configuration of the primary-side cycle in the heat source unit A and the relay unit B will be explained first. The primary-side cycle refers to a cycle through which a refrigerant circulates. In the heat source unit A, the four-way valve 2 is selectively switched in accordance with the operation of the heat-source-side heat exchanger 3. That is, the four-way valve 2 is switched to the direction represented by the solid lines in the drawing in the case where the heat-source-side heat exchanger 3 operates as a condenser that transfers heat from the refrigerant to air, and is switched to the direction represented by the broken lines in the drawing in the case where the heat-source-side heat exchanger 3 operates as an evaporator that receives heat from air.

In the case where a $CO_2$ refrigerant is used as the refrigerant, since the critical temperature is as low as about 30 degrees Centigrade, and a supercritical range is reached in the course of heat transfer, the heat-source-side heat exchanger 3 can rather be said to act as a radiator. However, in the present specification, the heat-source-side heat exchanger 3 is described as a condenser, in correspondence with an evaporator.

In the relay unit B, when all operating indoor units out of the indoor units C to E are performing cooling, both the intermediate heat exchangers 9a and 9b operate as evaporators. When all operating indoor units out of the indoor units C to E are performing heating, both the intermediate heat exchangers 9a and 9b operate as condensers. When operating indoor units out of the indoor units C to E are performing cooling and heating in combination, one of the intermediate heat exchangers 9a and 9b operates as a condenser and the other one of the intermediate heat exchangers 9a and 9b operates as an evaporator. In a cooling operation and a heating operation, the capacities of the intermediate heat exchangers are increased using both the intermediate heat exchangers 9a and 9b as evaporators or condensers, thereby improving their cooling and heating performance.

Here, in the case where the first solenoid valve 11a and the second solenoid valve 11b are opened and the third solenoid valve 11c and the fourth solenoid valve 11d are closed, the intermediate heat exchangers 9a and 9b operate as condensers. Also, in the case where the third solenoid valve 11c and the fourth solenoid valve 11d are opened and the first solenoid valve 11a and the second solenoid valve 11b are closed, the intermediate heat exchangers 9a and 9b operate as evaporators. Since the first solenoid valve 11a and the third solenoid valve 11c are not opened at the same time and the second solenoid valve 11b and the fourth solenoid valve 11d are not opened at the same time, they may be replaced with three-way valves or the like.

The first flow control device 10a and the second flow control device 10b connect the intermediate heat exchangers 9a and 9b to the third branch portion 8c. With reference to the pieces of temperature information obtained by the thermometers 33a to 33d, the first flow control device 10a and the second flow control device 10b are adjusted on the basis of the degree of superheat of refrigerant at the outlet of an intermediate heat exchanger when the intermediate heat exchanger operates as an evaporator, and are adjusted on the basis of the degree of subcooling of refrigerant at the outlet of an intermediate heat exchanger when the intermediate heat exchanger operates as a condenser. The evaporating temperature and the condensing temperature necessary to calculate the degree of superheat and the degree of subcooling of refrigerant at the outlet of an intermediate heat exchanger may be calculated from the pieces of information obtained using the pressure gauges 31 and 32 installed within the heat source unit A, which will be described below, or may be calculated by installing pressure gauges at the first branch portion 8a and the second branch portion 8b within the relay unit B and referring to the values detected by the pressure gauges.

In the following description, assume that in a cooling operation in which all operating indoor units are performing cooling, the third solenoid valve 11c and the fourth solenoid valve 11d are opened, the first solenoid valve 11a and the second solenoid valve 11b are closed, and both the intermediate heat exchangers 9a and 9b operate as evaporators. Assume also that in a heating operation in which all operating indoor units are performing heating, the first solenoid valve 11a and the second solenoid valve 11b are opened, the third solenoid valve 11c and the fourth solenoid valve 11d are closed, and both the intermediate heat exchangers 9a and 9b operate as condensers. Assume moreover that in a cooling and heating simultaneous operation in which an indoor unit performing cooling and an indoor unit performing heating exist at the same time, the first solenoid valve 11a and the fourth solenoid valve 11d are opened, the second solenoid valve 11b and the third solenoid valve 11c are opened, the intermediate heat exchanger 9a operates as a condenser, and the intermediate heat exchanger 9b operates as an evaporator.

The third flow control device 12a connects between the first branch portion 8a and the third branch portion 8c, and adjusts the flow rate of refrigerant bypassing the intermediate heat exchangers 9a and 9b. The fourth flow control device 12b connects between the third branch portion 8c and the second branch portion 8b, and adjusts the flow rate of refrigerant bypassing the intermediate heat exchangers 9a and 9b.

The refrigerant-refrigerant heat exchanger 13 exchanges heat between the refrigerant flowing through the passage between the first flow control device 12a and the third branch portion 8c and the refrigerant flowing through the passage between the fourth flow control device 12b and the second branch portion 8b. The refrigerant-refrigerant heat exchanger 13 cools the refrigerant flowing into the first flow control device 10a, the second flow control device 10b, and the fourth flow control device 12b in the case where the intermediate heat exchanger 9a or 9b operates as an evaporator. The refrigerant-refrigerant heat exchanger 13 is installed because the refrigerant flowing into a flow control device changes from a two-phase gas-liquid state into a single-liquid-phase state by cooling the refrigerant, thus achieving stable flow control.

As the operation of the third flow control device 12a and the fourth flow control device 12b in each operation mode, during, for example, a cooling operation, the third flow control device 12a is fully opened, and the opening degree of the fourth flow control device 12b is controlled on the basis of the degree of superheat of the low-pressure-side refrigerant at the outlet of the refrigerant-refrigerant heat exchanger 13 by referring to the thermometer 33e. Furthermore, during a cooling and heating simultaneous operation, both the third flow control device 12a and the fourth flow control device 12b are fully closed. Moreover, during a heating operation, the third flow control device 12a is fully closed, and the fourth flow control device 12b is fully opened.

Basically, the third flow control device 12a does not adjust the flow rate of the refrigerant bypassing a condenser. Therefore, the third flow control device 12a may be an opening and closing valve, such as a solenoid valve, as illustrated in FIG. 1. Furthermore, the refrigerant-refrigerant heat exchanger 13 may be omitted, and a refrigerant circuit may be arranged in such a manner that the refrigerant flowing out of the intermediate heat exchanger 9a serving as a condenser passes through the refrigerant-refrigerant heat exchanger 13 into the third branch portion 8c during a cooling and heating simultaneous operation.

The circuit configuration of the secondary-side cycle in the relay unit B will be explained next. The secondary-side cycle is a cycle through which the second refrigerant circulates. The intermediate heat exchangers 9a and 9b are connected by pipes in such a manner that the flow of the refrigerant in the primary-side cycle and the flow of brine in the secondary-side cycle are opposed to each other in the case where the intermediate heat exchangers 9a and 9b operate as condensers. With this configuration, when the intermediate heat exchangers 9a and 9b operate as evaporators, only the flow direction of refrigerant changes, and operation is performed in which the flow of the refrigerant and the flow of brine are in parallel to each other. However, by installing valves at an inlet and an outlet of brine of an intermediate heat exchanger so that the flow of brine flowing into or out of the intermediate heat exchangers 9a and 9b can be changed, to perform control to achieve opposed flows both for a condenser and an evaporator, efficient heat exchange can be achieved.

As illustrated in FIG. 2, flow passage switching valves 21a and 21b that change the flow of brine in an intermediate heat exchanger may not be attached at the intermediate heat exchanger 9a but may be attached only at the intermediate heat exchanger 9b operating as an evaporator during a cooling and heating simultaneous operation. With this arrangement, in a mode in which the intermediate heat exchanger 9b operates as an evaporator, the flow of the refrigerant and the flow of brine are opposed to each other in portions other than the intermediate heat exchanger 9a during a cooling operation. Therefore, the cooling capacity can be efficiently improved while suppressing an increase in cost.

Furthermore, the first pump 18a and the second pump 18b of an inverter type are connected in proximity to the intermediate heat exchangers 9a and 9b and are connected to the fourth branch portion 8d and the fifth branch portion 8e, respectively. Furthermore, the other pipes for the intermediate heat exchangers 9a and 9b are connected to the sixth branch portion 8f and the seventh branch portion 8g, respectively. The position of the first pump 18a and the position of the intermediate heat exchanger 9a in the secondary-side cycle may be inverted. Similarly, the position of the second pump 18b and the position of the intermediate heat exchanger 9b in the secondary-side cycle may be inverted.

Since both the intermediate heat exchangers 9a and 9b operate as evaporators in the case where all operating indoor units are performing cooling and both the intermediate heat exchangers 9a and 9b operate as condensers in the case where all operating indoor units are performing heating, the switching valves 19c to 19n may be connected to either intermediate heat exchanger or all of them may be opened so that brine flows into the switching valves from both intermediate heat exchangers. In contrast, during a cooling and heating simultaneous operation, the switching valves 19c to 19n are operated in such a manner that an indoor unit performing cooling is connected to the intermediate heat exchanger 9b operating as an evaporator and an indoor unit performing heating is connected to the intermediate heat exchanger 9a operating as a condenser.

Furthermore, the flow control devices 20c to 20e that adjust the flow rates of brine flowing into corresponding indoor units are installed at the second brine pipes 7c to 7e between the indoor heat exchangers 5c to 5e and the switching valves switching valves 19i to 19n. The flow control devices 20c to 20e may be installed on the side of the first brine pipes 6c to 6e. The opening degrees of the flow control devices 20c to 20e are controlled such that, for example, the differences in temperature of brine at inlets and outlets of the indoor units C to E stay constant.

As a method for measuring the temperature of brine, measurement of the inlet and output temperatures of the indoor units C to E is possible. For example, by defining the temperatures of brine flowing out of the intermediate heat exchangers 9a and 9b as the inlet temperatures of the indoor units C to E and defining the temperature of brine returning from the indoor units C to E to the relay unit B as the outlet temperatures of the indoor units C to E, as illustrated in the drawing, control may be performed such that the differences between the temperatures become equal to a predetermined value. The temperatures of the brine that has flowed out of the intermediate heat exchangers 9a and 9b can be measured by the thermometers 34a and 34b arranged on the downstream side of the first pump 18a and the second pump 18b, respectively. Furthermore, the temperatures of the brine returning from the indoor units C to E to the relay unit B can be measured by the thermometers 34c to 34e provided between the indoor heat exchangers 5c to 5e and the flow control devices 20c to 20e.

The target value for the temperature difference is set to about 3 to 7 degrees Centigrade for a cooling operation, as described in Patent Literature 2. By setting the control target value larger in a heating operation than in cooling, an efficient operation can be achieved. Furthermore, the first pump 18a and the second pump 18b may be driven at a constant speed. However, in the flow control devices 20c to 20e for brine, temperature difference control of which is in progress, control can be performed by changing the pump capacity in such a manner that the opening degree of the flow control device whose opening degree is largest is set to, for example, 80% to 95% of the maximum opening degree.

[Operation Mode]

A running operation at the time of various operations executed by the air-conditioning apparatus 100 will be explained next. The running operation of the air-conditioning apparatus 100 includes four modes: a cooling operation mode, a heating operation mode, a cooling main operation mode, and a heating main operation mode. Hereinafter, the flow of refrigerant and brine in each operation mode will be explained with reference to P-h diagrams.

A cooling operation is an operation mode in which an indoor unit is capable of only cooling and the indoor unit is performing cooling or is stopped. An operation is an operation mode in which an indoor unit is capable of only heating and the indoor unit is performing heating or is stopped. A cooling main operation is an operation mode in which each indoor unit is capable of selecting cooling or heating and in a cooling and heating simultaneous operation mode in which an indoor unit performing cooling and an indoor unit performing heating exist at the same time, the cooling load is heavier than heating load, and the heat-source-side heat exchanger 3 is connected to the discharge side of the compressor and operates as a condenser. A heating main operation is an operation mode in which in a cooling and heating simultaneous operation, the heating load is heavier than the cooling load, and the heat-source-side heat exchanger 3 is connected to the suction side of the compressor and operates as an evaporator.

[Cooling Operation]

Figure 3:
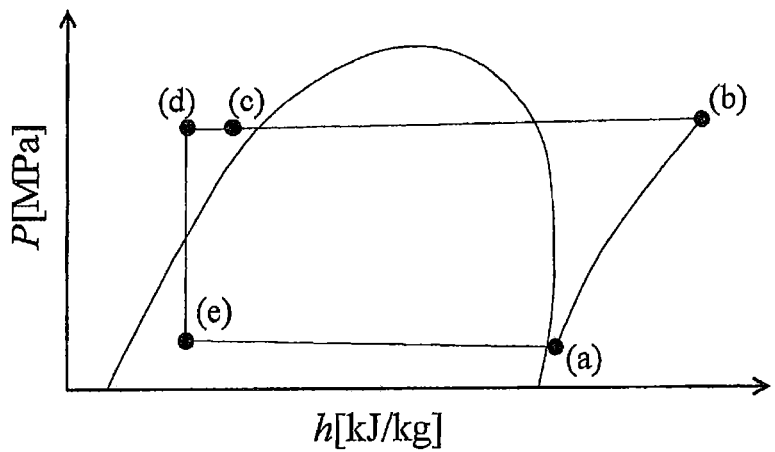
FIG. 3 is a P-h diagram illustrating the transition of refrigerant in a cooling operation.

The case where all the indoor units C, D, and E intend to perform cooling will be explained hereinafter. In cooling, the four-way valve 2 is switched so that the refrigerant discharged from the compressor 1 flows into the heat-source-side heat exchanger 3. The third solenoid valve 11c and the fourth solenoid valve 11d are opened, and the first solenoid valve 11a and the second solenoid valve 11b are closed. At this time, both the first intermediate heat exchanger 9a and the second intermediate heat exchanger 9b operate as evaporators. FIG. 3 is a P-h diagram illustrating the transition of refrigerant in a cooling operation. The flow of refrigerant will be explained first, and the flow of brine will be explained next.

In this state, the operation of the compressor 1 starts. A low-temperature and low-pressure gas refrigerant is compressed by the compressor 1 and is discharged as a high-temperature and high-pressure gas refrigerant. In the refrigerant compression process by the compressor 1, compression is performed in such a manner that the refrigerant is heated more than when the refrigerant is adiabatically compressed based on an isentropic line by an amount corresponding to the adiabatic efficiency of the compressor, and is represented by a line extending from point (a) to point (b) in FIG. 3.

The high-temperature and high-pressure gas refrigerant discharged from the compressor 1 flows into the heat-source-side heat exchanger 3 via the four-way valve 2. At this time, the refrigerant is cooled while heating outdoor air, and turns into an intermediate-temperature and high-pressure liquid refrigerant. The change of the refrigerant in the heat-source-side heat exchanger 3 is represented by a slightly-slanted substantially horizontal straight line extending from point (b) to point (c) in FIG. 3, in view of pressure loss in the heat-source-side heat exchanger 3.

The intermediate-temperature and high-pressure liquid refrigerant that has flowed out of the heat-source-side heat exchanger 3 passes through the first refrigerant pipe 6 and the third flow control device 12a, exchanges heat in the refrigerant-refrigerant heat exchanger 13 with the refrigerant that has flowed out of the fourth flow control device 12b, and is cooled. The cooling process at this time is represented by a line extending from point (c) to point (d) in FIG. 3.

The liquid refrigerant cooled at the refrigerant-refrigerant heat exchanger 13 flows into the first flow control device 10a and the second flow control device 10b while the refrigerant partially bypasses the second branch portion 8b through the fourth flow control device 12b. Then, the high-pressure liquid refrigerant is expanded and decompressed by the first flow control device 10a and the second flow control device 10b, and turns into a low-temperature and low-pressure, two-phase gas-liquid state. A change of the refrigerant occurs with a constant enthalpy at the first flow control device 10a and the second flow control device 10b. The change of the refrigerant at this time is represented by a vertical line extending from point (d) to point (e) in FIG. 3.

The low-temperature and low-pressure refrigerant in the two-phase gas-liquid state that has flowed out of the first flow control device 10a and the second flow control device 10b flows into the first intermediate heat exchanger 9a and the second intermediate heat exchanger 9b. Then, the refrigerant is heated while cooling brine, and turns into a low-temperature and low-pressure gas refrigerant. The change of the refrigerant at the first intermediate heat exchanger 9a and the second intermediate heat exchanger 9b is represented by a slightly-slanted substantially horizontal straight line extending from point (e) to point (a) in FIG. 3, in view of pressure loss.

The low-temperature and low-pressure gas refrigerants that have flowed out of the first intermediate heat exchanger 9a and the second intermediate heat exchanger 9b pass through the third solenoid valve 11c and the fourth solenoid valve 11d, respectively, and flow into the second branch portion 8b. The low-temperature and low-pressure gas refrigerants merge together at the second branch portion 8b. The merged refrigerant passes through the second refrigerant pipe 7 and the four-way valve 2, flows into the compressor 1, and is compressed.

Next, the flow of brine will be explained. Since all the indoor units C, D, and E are performing cooling, the switching valves 19c to 19h and 19i to 19n for brine are opened, and brines travel from the fourth branch portion 8d and the fifth branch portion 8e to the first brine pipes 6c to 6e on the indoor side and from the second brine pipes 7c to 7e on the indoor side to the sixth branch portion 8f and the seventh branch portion 8g. The brines cooled by the refrigerant at the first intermediate heat exchanger 9a and the second intermediate heat exchanger 9b are subjected to pressurization and driven by the first pump 18a and the second pump 18b, and flow into the fourth branch portion 8d and the fifth branch portion 8e.

The brines flowing into the fourth branch portion 8d and the fifth branch portion 8e are mixed at the switching valves 19c to 19h for brine, and flow into the indoor units C to E through the first brine pipes 6c to 6e on the indoor side. The brines cool the indoor air at the indoor heat exchangers 5c to 5e, and cooling is performed. At the time of cooling, the brines are heated by the indoor air, pass through the second brine pipes 7c to 7e on the indoor side, and return to the relay unit B. The brines flow into the first intermediate heat exchanger 9a and the second intermediate heat exchanger 9b while being expanded and decompressed by the flow control devices 20c to 20e for brine.

[Heating Operation]

Figure 4:
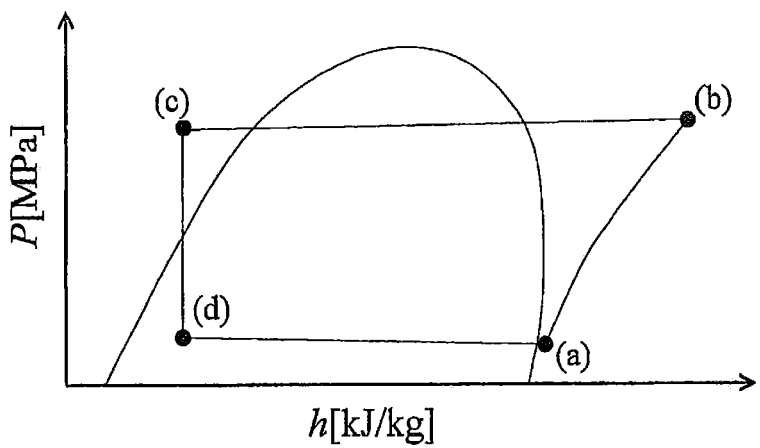
FIG. 4 is a P-h graph illustrating the transition of refrigerant in a heating operation.

The case where all the indoor units C, D, E intend to perform heating will now be explained. In a heating operation, the four-way valve 2 is switched so that the refrigerant discharged from the compressor 1 flows into the first branch portion 8a. The first solenoid valve 11a and the second solenoid valve 11b are opened, and the third solenoid valve 11c and the fourth solenoid valve 11d are closed. At this time, both the first intermediate heat exchanger 9a and the second intermediate heat exchanger 9b operate as condensers. FIG. 4 is a P-h diagram illustrating the transition of refrigerant in the heating operation. The flow of refrigerant will be explained first, and the flow of brine will be explained next.

In this state, the operation of the compressor 1 starts. A low-temperature and low-pressure gas refrigerant is compressed by the compressor 1 and is discharged as a high-temperature and high-pressure gas refrigerant. The refrigerant compression process by the compressor is represented by a line extending from point (a) to point (b) in FIG. 4.

The high-temperature and high-pressure gas refrigerant discharged from the compressor 1 flows into the first branch portion 8a through the four-way valve 2 and the first refrigerant pipe 6. The high-temperature and high-pressure gas refrigerant that has flowed into the first branch portion 8a is branched at the first branch portion 8a, and the branched refrigerants pass through the first solenoid valve 11a and the second solenoid valve 11b, and flow into the first intermediate heat exchanger 9a and the second intermediate heat exchanger 9b. The refrigerants are cooled while heating brine, and turn into intermediate-temperature and high-pressure liquid refrigerants. The change of the refrigerants in the first intermediate heat exchanger 9a and the second intermediate heat exchanger 9b is represented by a slightly-slanted substantially horizontal straight line extending from point (b) to point (c) in FIG. 4.

The intermediate-temperature and high-pressure refrigerants that have flowed out of the first intermediate heat exchanger 9a and the second intermediate heat exchanger 9b flow into the first flow control device 10a and the second flow control device 10b, merge together at the third branch portion 8c, and the merged refrigerant flows into the fourth flow control device 12b. At this time, the high-pressure liquid refrigerants are expanded and decompressed at the first flow control device 10a, the second flow control device 10b, and the fourth flow control device 12b, and turn into a low-temperature and low-pressure, two-phase gas-liquid state. The change of the refrigerants at this time is represented by a vertical line extending from point (c) to point (d) in FIG. 4.

The low-temperature and low-pressure refrigerant in the two-phase gas-liquid state that has flowed out of the fourth flow control device 12b passes through the second refrigerant pipe 7, flows into the heat-source-side heat exchanger 3, is heated while cooling the outdoor air, and turns into a low-temperature and low-pressure gas refrigerant. The change of the refrigerant at the heat-source-side heat exchanger 3 is represented by a slightly-slanted substantially horizontal straight line extending from point (d) to point (a) in FIG. 4. The low-temperature and low-pressure gas refrigerant that has flowed out of the heat-source-side heat exchanger 3 passes through the four-way valve 2, flows into the compressor 1, and is compressed.

Next, the flow of brine will be explained. The flow of brine is substantially similar to that at the time of a cooling operation. Since all the indoor units C, D, and E are performing heating, the switching valves 19c to 19h and 19i to 19n for brine are opened, and brines travel from the fourth branch portion 8d and the fifth branch portion 8e to the first brine pipes 6c to 6e on the indoor side and from the second brine pipes 7c to 7e on the indoor side to the sixth branch portion 8f and the seventh branch portion 8g. The brines heated by refrigerants at the first intermediate heat exchanger 9a and the second intermediate heat exchanger 9b are subjected to pressurization and driven at the first pump 18a and the second pump 18b, and flow into the fourth branch portion 8d and the fifth branch portion 8e.

The brines that have flowed into the fourth branch portion 8d and the fifth branch portion 8e are mixed by the switching valves 19c to 19h for brine, and pass through the first brine pipes 6c to 6e on the indoor side and flow into the indoor units C to E. The brines heat the indoor air at the indoor heat exchangers 5c to 5e, and heating is performed. At the time of heating, the brines are cooled by the indoor air, pass through the second brine pipes 7c to 7e on the indoor side, and return to the relay unit B. The brines flow into the first and second intermediate heat exchangers 9a and 9b while being expanded and decompressed by the flow control devices 20c to 20e for brine.

[Cooling Main Operation]

Figure 5:
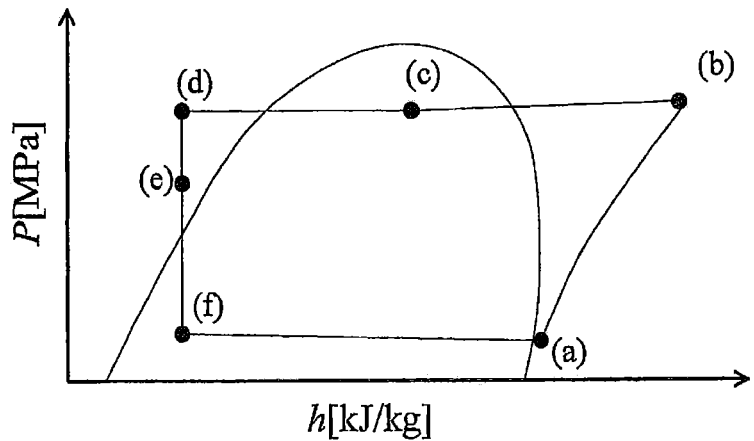
FIG. 5 is a P-h graph illustrating the transition of refrigerant in a cooling main operation.

The case where the indoor units C and D are performing cooling and the indoor unit E is performing heating will now be explained. In this case, the four-way valve 2 is switched so that the refrigerant discharged from the compressor 1 flows into the heat-source-side heat exchanger 3. The first solenoid valve 11a and the fourth solenoid valve 11d are opened, and the second solenoid valve 11b and the third solenoid valve 11c are closed. At this time, the first intermediate heat exchanger 9a operates as a condenser and the second intermediate heat exchanger 9b operates as an evaporator. FIG. 5 is a P-h diagram illustrating the transition of refrigerant in the cooling main operation. The flow of refrigerant will be explained first, and the flow of brine will be explained next.

In this state, the operation of the compressor 1 starts. A low-temperature and low-pressure gas refrigerant is compressed by the compressor 1, and is discharged as a high-temperature and high-pressure gas refrigerant. The refrigerant compression process by the compressor is represented by a line extending from point (a) to point (b) in FIG. 5.

The high-temperature and high-pressure gas refrigerant discharged from the compressor 1 flows into the heat-source-side heat exchanger 3 via the four-way valve 2. At this time, in the heat-source-side heat exchanger 3, the refrigerant is cooled while heating the outdoor air with a heat quantity necessary for heating being left intact, and turns into an intermediate-temperature and high-pressure, two-phase gas-liquid state. The change of the refrigerant at the heat-source-side heat exchanger 3 is represented by a slightly-slanted substantially horizontal straight line extending from point (b) to point (c) in FIG. 5.

The intermediate-temperature and high-pressure, two-phase gas-liquid refrigerant that has flowed out of the heat-source-side heat exchanger 3 passes through the first refrigerant pipe 6, the first branch portion 8a, and the first solenoid valve 11a, and flows into the first intermediate heat exchanger 9a. Then, the refrigerant is cooled while heating brine, and turns into an intermediate-temperature and high-pressure liquid refrigerant. The change of the refrigerant at the first intermediate heat exchanger 9a is represented by a slightly-slanted substantially horizontal straight line extending from point (c) to point (d) in FIG. 5. The refrigerant that has flowed out of the intermediate heat exchanger 9a is expanded and decompressed by the first flow control device 10a. The change of the refrigerant at this time is represented by a vertical line extending from point (d) to point (e) in FIG. 5. The refrigerant is further expanded and decompressed by the second flow control device 10b, and turns into a low-temperature and low-pressure, two-phase gas-liquid state. The change of the refrigerant at this time is represented by a vertical line extending from point (e) to point (f) in FIG. 5.

The low-temperature and low-pressure refrigerant in the two-phase gas-liquid state that has flowed out of the second flow control device 10b flows into the second intermediate heat exchanger 9b. Then, the refrigerant is heated while cooling brine, and turns into a low-temperature and low-pressure gas refrigerant. The change of the refrigerant at the second intermediate heat exchanger 9b is represented by a slightly-slanted substantially horizontal straight line extending from point (f) to point (a) in FIG. 5, in view of pressure loss. The low-temperature and low-pressure gas refrigerant that has flowed out of the second intermediate heat exchanger 9b passes through the fourth solenoid valve 11d and flows into the second branch portion 8b. The low-temperature and low-pressure gas refrigerant that has flowed into the second branch portion 8b passes through the second refrigerant pipe 7 and the four-way valve 2, flows into the compressor 1, and is compressed.

The first flow control device 10a at this time may be controlled such that the degree of subcooling of the refrigerant at the outlet of the first intermediate heat exchanger 9a reaches a predetermined value, and the second flow control device 10b can be set to be fully opened. Furthermore, by installing a pressure gauge at the third branch portion 8c, the fourth flow control device 12b may be controlled such that the pressure at the third branch portion 8c stays constant, the first flow control device 10a may be controlled such that the degree of subcooling of the refrigerant at the outlet of the first intermediate heat exchanger 9a reaches a predetermined value, and the second flow control device 10b may be controlled such that the degree of superheat of the refrigerant at the outlet of the first intermediate heat exchanger 9a stays constant.

Next, the flow of brine will be explained. Since the indoor units C and D are performing cooling and the indoor unit E is performing heating, the switching valves 19e, 19f, 19g, 19k, 19l, and 19m for brine are opened, and the switching valves 19c, 19d, 19h, 19i, 19j, and 19n for brine are closed.

The brine heated by the refrigerant at the first intermediate heat exchanger 9a is subjected to pressurization and driven by the first pump 18a, and flows into the fourth branch portion 8d. The brine that has flowed into the fourth branch portion 8d passes through the switching valve 19e for brine and the first brine pipe 6e on the indoor side, and flows into the indoor unit E. The brine heats the indoor air at the indoor heat exchanger 5e, and heating is performed. At the time of heating, the brine is cooled by the indoor air, passes through the second brine pipe 7e on the indoor side, and returns to the relay unit B. The brine flows into the first intermediate heat exchanger 9a while being expanded and decompressed by the flow control device 20e for brine.

In contrast, the brine cooled by the refrigerant at the second intermediate heat exchanger 9b is subjected to pressurization and driven by the second pump 18b, and flows into the fifth branch portion 8e. The brine that has flowed into the fifth branch portion 8e passes through the switching valves 19f and 19g for brine and the first brine pipes 6c and 6d on the indoor side, and flows into the indoor units C and D. The brine cools the indoor air at the indoor heat exchangers 5c and 5d, and cooling is performed. At the time of cooling, the brine is heated by the indoor air, passes through the second brine pipes 7c and 7d on the indoor side, and returns to the relay unit B. The brine flows into the second intermediate heat exchanger 9b while being expanded and decompressed by the flow control devices 20c and 20d for brine.

[Heating Main Operation]

Figure 6:
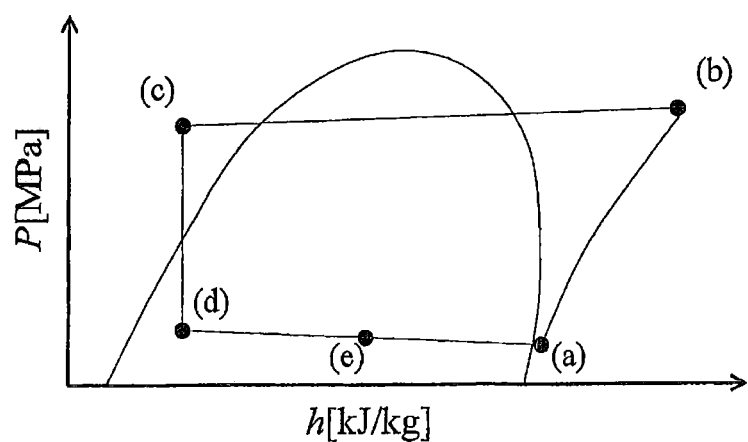
FIG. 6 is a P-h diagram illustrating the transition of refrigerant in a heating main operation.

The case where the indoor unit C is performing cooling and the indoor units D and E are performing heating will now be explained. In this case, the four-way valve 2 is switched so that refrigerant discharged from the compressor 1 is caused to flow into the first branch portion 8a. The first solenoid valve 11a and the fourth solenoid valve 11d are opened, and the second solenoid valve 11b and the third solenoid valve 11c are closed. At this time, the first intermediate heat exchanger 9a operates as a condenser and the second intermediate heat exchanger 9b operates as an evaporator. FIG. 6 is a P-h diagram illustrating the transition of refrigerant in the heating main operation. The flow of refrigerant will be explained first, and the flow of brine will be explained next.

In this state, the operation of the compressor 1 starts. The low-temperature and low-pressure gas refrigerant is compressed by the compressor 1, and is discharged as a high-temperature and high-pressure gas refrigerant. The refrigerant compression process by the compressor is represented by a line extending from point (a) to point (b) in FIG. 6.

The high-temperature and high-pressure gas refrigerant discharged from the compressor 1 flows into the first branch portion 8a through the four-way valve 2 and the first refrigerant pipe 6. The high-temperature and high-pressure gas refrigerant that has flowed into the first branch portion 8a passes through the first branch portion 8a and the first solenoid valve 11a, and flows into the first intermediate heat exchanger 9a. Then, the refrigerant is cooled while heating brine, and turns into an intermediate-temperature and high-pressure liquid refrigerant. The change of the refrigerant at the first intermediate heat exchanger 9a is represented by a slightly-slanted substantially horizontal straight line extending from point (b) to point (c) in FIG. 6.

The refrigerant that has flowed out of the first intermediate heat exchanger 9a is expanded and decompressed by the first flow control device 10a and the second flow control device 10b. The change of the refrigerant at this time is represented by a vertical line extending from point (c) to point (d) in FIG. 6. The low-temperature and low-pressure refrigerant in the two-phase gas-liquid state that has flowed out of the second flow control device 10b flows into the second intermediate heat exchanger 9b. The refrigerant is heated while cooling brine by a heating quantity necessary for an indoor unit, and turns into a low-temperature and low-pressure refrigerant. The change of the refrigerant at the second intermediate heat exchanger 9b is represented by a slightly-slanted substantially horizontal straight line extending from point (d) to point (e) in FIG. 6, in view of pressure loss.

The low-temperature and low-pressure refrigerant that has flowed out of the second intermediate heat exchanger 9b passes through the second refrigerant pipe 7, flows into the heat-source-side heat exchanger 3, is heated while cooling the outdoor air, and turns into a low-temperature and low-pressure gas refrigerant. The change of the refrigerant at the heat-source-side heat exchanger 3 is represented by a slightly-slanted substantially horizontal straight line extending from point (e) to point (a) in FIG. 6. The low-temperature and low-pressure gas refrigerant that has flowed out of the heat-source-side heat exchanger 3 passes through the four-way valve 2, flows into the compressor 1, and is compressed.

The first flow control device 10a at this time may be controlled such that the degree of subcooling of the refrigerant at the outlet of the first intermediate heat exchanger 9a reaches a predetermined value, and the second flow control device 10b can be set to be fully opened. Furthermore, as illustrated in FIG. 7, for example, by operating the fourth flow control device 12b so that the pressure at the third branch portion 8c stays constant, causing the liquid refrigerant to be split at the third branch portion 8c, controlling the first flow control device 10a so that the degree of subcooling of the refrigerant at the outlet of the first intermediate heat exchanger 9a reaches a predetermined value, and controlling the second flow control device 10b so that the degree of superheat of the refrigerant at the outlet of the first intermediate heat exchanger 9a reaches a predetermined value, the flow rate of the refrigerant flowing into the second intermediate heat exchanger 9b can be adjusted, thereby enabling load adjustment to be smoothly performed.

Figure 7:
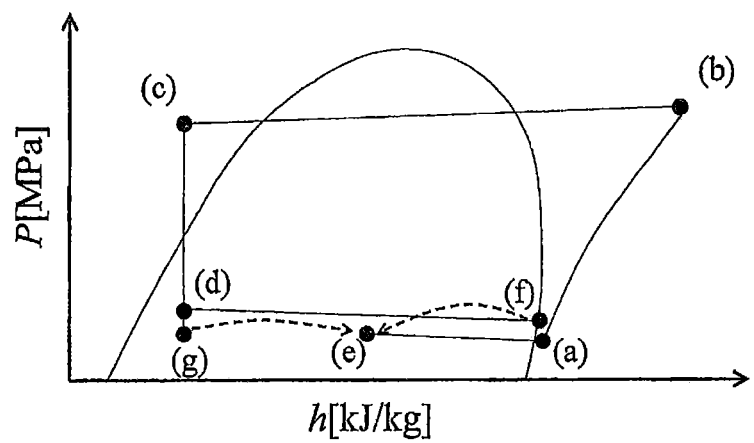
FIG. 7 is a P-h diagram illustrating another example of the transition of refrigerant in the heating main operation.

In FIG. 7, point (f) represents the state of the refrigerant at the outlet of the second intermediate heat exchanger 9b, point (g) represents the state of the refrigerant that has flowed out of the fourth flow control device 12b, and point (e) represents the state after the refrigerant at point (f) and the refrigerant at point (g) merge together at the first branch portion. FIG. 7 is a P-h diagram illustrating another example of the transition of refrigerant in the heating main operation.

The flow of brine is substantially the same as that in the explanation of the flow of brine in the cooling main operation, and only connection of the indoor unit D is changed from the second intermediate heat exchanger 9b to the first intermediate heat exchanger 9a. Therefore, an explanation of the flow of brine will be omitted.

In the air-conditioning apparatus 100, the heat source unit A includes the control means 50, the relay unit B includes the control means 51, and the indoor units C to E include the control means 52c to 52e, respectively. In this configuration, the control means is installed in each of the heat source unit A, the relay unit B, and the indoor units C to E. However, there will be no problem if control means is integrated into one unit and actuators are controlled by communicating control values among individual units. In the explanation provided below, the control means 50, 51, and 52c to 52e will sometimes be collectively referred to as control means.

The control means 52c to 52e perform driving control, such as operation, stopping, and the like of fan motors for the fans 5c-m to 5e-m on the basis of the settings of remote control for the indoor units C to E and the current indoor temperature. As described above, the control means 51 performs setting of the opening degree of flow control devices, switching of solenoid valves, and driving of pumps in the relay unit B, in accordance with the operation mode based on the operation capacity for cooling and heating of the indoor units C to E. In contrast, the control means 50 performs driving of the compressor 1, switching of the four-way valve 2, and driving control of the fan motor for the fan 3-m.

Hereinafter, a method for driving the compressor 1 and the fan motor for the fan 3-m will be discussed. The compressor 1 and the fan motor for the fan 3-m are controlled, for example, as described in Patent Literature 1, on the basis of the pressure gauges 31 and 32 attached to the input and output channels of the compressor 1, so that a fixed target pressure is reached. In the case where discharge pressure cannot be controlled during a cooling main operation, connection of the four-way valve 2 is switched. In the case where suction pressure cannot be controlled during a heating main operation, connection of the four-way valve 2 is switched. Accordingly, the operation mode is switched between the cooling main operation and the heating main operation. Here, there is a possibility that the capacities of the intermediate heat exchangers 9a and 9b may not be continuous with respect to a change in the number of operating indoor units among the indoor units C to E during a cooling and heating simultaneous operation and, therefore, the required heat exchange amount in one of the intermediate heat exchangers 9a and 9b may be increased.

In this explanation, two intermediate heat exchangers are provided for three indoor units. However, assuming that a plurality of small-capacity indoor units are connected, for example, in a cooling main operation based on an indoor capacity of 90 percent on cooling and 10 percent on heating, although load is reduced by only 10 percent compared to the case of 100 percent on cooling, the capacity of an intermediate heat exchanger for cooling is halved, thus increasing the load of the intermediate heat exchanger. Thus, during the cooling main operation, control is performed such that the evaporating temperature is set low by reducing the suction pressure at the compressor 1. The same applies to the relationship between a heating operation and a heating main operation.

Figure 8:
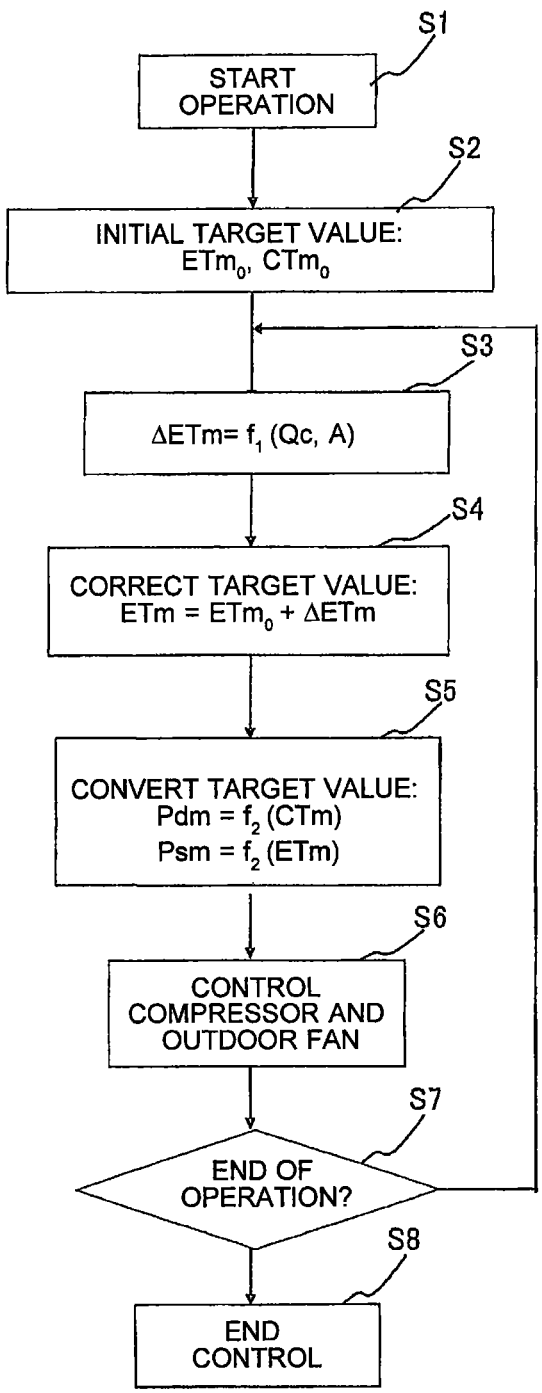
FIG. 8 is a flowchart illustrating the flow of a control process at the time of a cooling main operation of the air-conditioning apparatus according to Embodiment 1 of the present invention.

FIG. 8 illustrates a control flow at the time of a cooling main operation. FIG. 8 is a flowchart illustrating the flow of a control process at the time of a cooling main operation of the air-conditioning apparatus 100. Here, the case where each type of control is performed by the control means 50, 51, and 52c to 52e communicating with each other will be explained as an example.

In S1, the control means starts operation control. In S2, since, typically, the evaporating temperature of a refrigeration cycle needs to be about 10 degrees Centigrade to perform cooling and the condensing temperature needs to be about 40 to 50 degrees Centigrade to perform heating, the control means sets an initial value ETm0 of a target value for the evaporating temperature and an initial value CTm0 of a target value for the condensing temperature by taking pressure loss of refrigerant generated in the interval from the heat source unit A to the relay unit B into consideration for the above values. Since a change in the capacity of the intermediate heat exchangers 9a and 9b is not continuous with respect to a change in the capacity of the indoor units C to E, the cooling load may be increased with respect to the capacity of the intermediate heat exchanger 9b operating as an evaporator during a cooling main operation.

Thus, in S3, the control means performs the following operation. In the case of expression (1) provided below, where At is the heat transfer area of the intermediate heat exchangers 9a and 9b at the time of a cooling operation, Arc is the heat transfer area of the intermediate heat exchanger 9b operating as an evaporator at the time of a cooling main operation, Qct is the rated load of cooling, and Qc is the current cooling load, it is determined that the load of the intermediate heat exchanger 9b operating as an evaporator is increased compared to the time of a cooling rated operation, and a change amount $\Delta$Etm in the target value for the evaporating temperature is calculated.

$$Qc > Qct \times (Arc/At) \qquad \text{Expression (1)}$$

Since the heat exchange amount is determined based on the product of the heat transfer area, the heat transfer coefficient, and the difference in temperature between fluids that perform heat exchange, on the assumption that the heat transfer coefficient is constant, the log-mean temperature difference between brine and refrigerant can be set to increase by the reciprocal of the cooling load ratio (Qc/Qct) and the reduction (Ar/At) in the heat transfer area, and the evaporating temperature can be set to reduce. This is represented by expression (2) provided below.

$$\Delta ETm = (1-(Qc/Qct)/(Ar/At)) \times dTc, \qquad \text{Expression (2)}$$

where dTc represents the log-mean temperature difference between refrigerant and brine at the time of a rated operation in an intermediate heat exchanger. Furthermore, by taking into consideration an improvement in heat transfer coefficient due to increases in flow rate of refrigerant and brine, control appropriate for the load can be achieved.

In S4, the control means updates the target value Etm for the evaporating temperature. In S5, the control means converts the target values for the evaporating temperature and the condensing temperature into pressures according to the physical property of refrigerant. In S6, the control means controls the frequency of the compressor 1 and the capacity of the heat-source-side heat exchanger 3 so that the discharge and suction pressures reach the target values.

Figure 9:
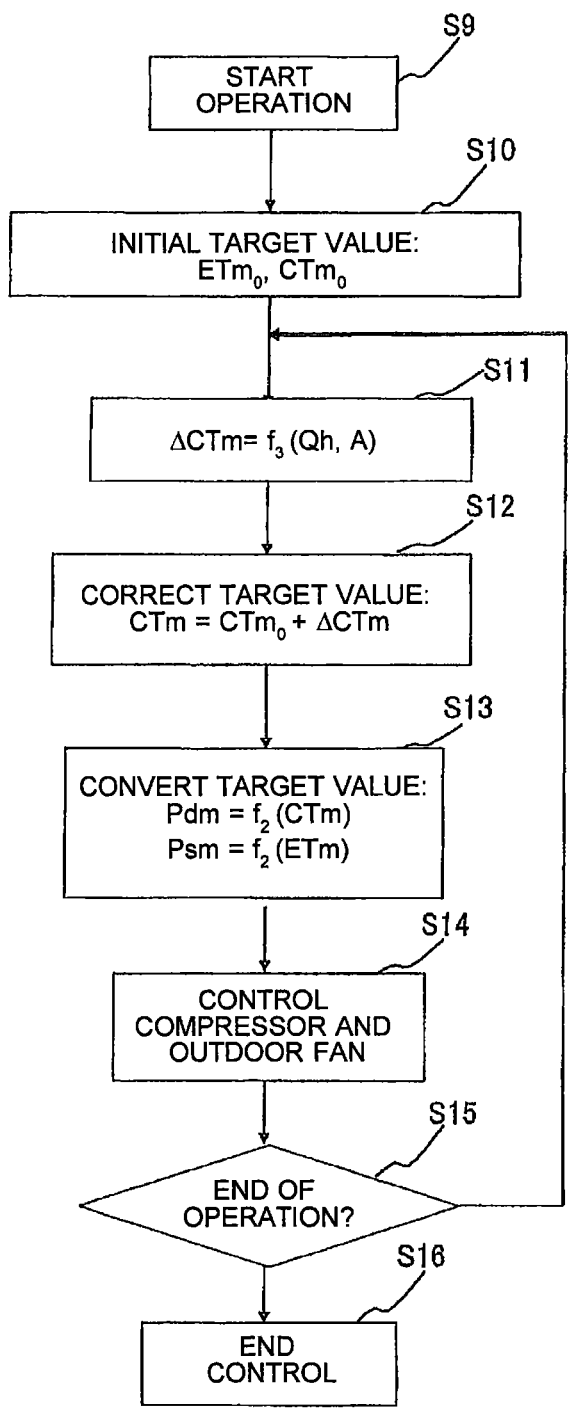
FIG. 9 is a flowchart illustrating the flow of a control process at the time of a heating main operation of the air-conditioning apparatus according to Embodiment 1 of the present invention.

FIG. 9 illustrates a control method in a heating main operation. FIG. 9 is a flowchart illustrating the flow of a control process at the time of a heating main operation of the air-conditioning apparatus 100. Here, the case where each type of control is performed by the control means 50, 51, and 52c to 52e communicating with each other will be exemplified. Thus, the control means 50, 51, and 52c to 52e will be collectively referred to as control means.

Control regarding S9 to S16 in the heating main operation is similar to that in the cooling main operation, and a change amount $\Delta$Ctm of the target value for the condensing temperature may be calculated using expression (3) provided below.

$$\Delta CTm = ((Qh/Qht)/(Arh/At)-1) \times dTh, \qquad \text{Expression (3)}$$

where Qh is the current heating load, Qht is the rated load of heating, Arh represents the heat transfer area of a condenser at the time of a heating main operation, At represents the heat transfer area of the intermediate heat exchanger 9a at the time of a heating operation, and dTh represents the log-mean temperature difference between refrigerant and brine at the time of a rated operation in an intermediate heat exchanger.

In an air-conditioning apparatus 100 capable of a cooling and heating simultaneous operation with the configuration described above, operation is performed such that the control target value for the compressor suction pressure at the time of a cooling main operation is set equal to or lower than that at the time of a cooling operation and the control target value for the compressor discharge pressure at the time of a heating main operation is set equal to or higher than that at the time of a heating operation, thereby improving the efficiency and increasing the heating capacity in the individual operation modes.

Furthermore, $\Delta$ETm may be determined based on the capacity of the first pump 18a of a brine circuit for cooling, and $\Delta$CTm may be determined based on the capacity of the second pump 18b of a brine circuit for heating. When the capacity of a pump has reached 100 percent, it is determined that the conveyance power of the pump is insufficient, the target value for the difference in temperature between outlet and inlet of brine is increased, that is, the required flow rate is reduced to lower the load of the pump. At the same time, when a pump for cooling has reached 100 percent, $\Delta$ETm is set so that ETm is reduced, and when a pump for heating has reached 100 percent, $\Delta$CTm is set so that CTm is increased. With this operation, the load is adjusted at the compressor. This method makes it possible to improve the efficiency and increase the heating capacity, irrespective of the indoor temperature and load.

Furthermore, in the case where the capacity of a pump has reached 100 percent or the opening degree of any of the valves of the flow control devices 20c to 20e has reached a maximum opening degree, there is a possibility that control appropriate for the capacity of the flow control devices 20c to 20e for the indoor units cannot be performed. Thus, the flow rate of brine is reduced, and the target value for the difference in temperature between outlet and inlet of brine is increased to enable flow control. When the target value for the difference in temperature between outlet and inlet of brine is increased, it is determined that the required capacity is increased, and $\Delta$ETm and $\Delta$CTm may be determined in such a manner that ET is reduced and CT is increased to interlock with control of a water circuit.

As described above, the air-conditioning apparatus 100 according to Embodiment 1 is controlled such that the first intermediate heat exchanger 9a and the second intermediate heat exchanger 9b each operate as an evaporator during a cooling operation, the first intermediate heat exchanger 9a operates as a condenser and the second intermediate heat exchanger 9b operates as an evaporator during a cooling main operation, and thus the number of intermediate heat exchangers operating as evaporators at the time of the cooling operation is greater than in the cooling main operation. In addition, control is performed such that the first intermediate heat exchanger 9a and the second intermediate heat exchanger 9b each operate as a condenser during a heating operation, the first intermediate heat exchanger 9a operates as a condenser and the second intermediate heat exchanger 9b operates as an evaporator during a heating main operation, and thus the number of intermediate heat exchangers operating as condensers at the time of the heating operation is greater than in the heating main operation. Furthermore, operation is performed in such a manner that the control target value for the compressor suction pressure at the time of a cooling main operation is set equal to or lower than that at the time of a cooling operation, and a control target value for the compressor discharge pressure at the time of a heating main operation is set equal to or higher than that at the time of a heating operation, thereby improving the efficiency and increasing the heating capacity in the individual operation modes. Therefore, with the air-conditioning apparatus 100, even if the load conditions change, the cooling and heating capacities are maintained, and operation in a state where the efficiency of cycle, such as COP, is high can be achieved.

Embodiment 2

Figure 10:
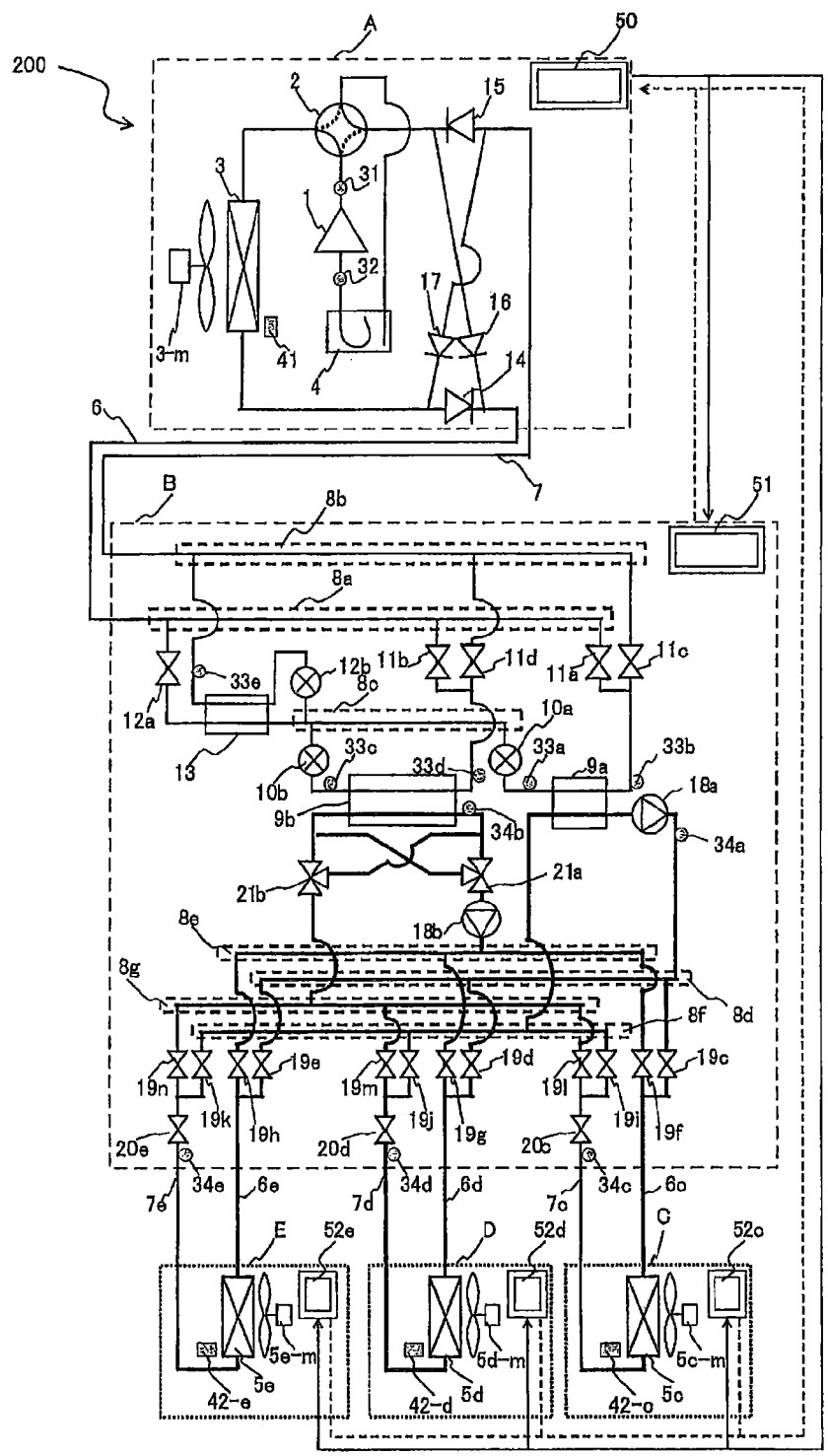
FIG. 10 is a schematic circuit configuration diagram illustrating an example of a refrigerant circuit configuration of an air-conditioning apparatus according to Embodiment 2 of the present invention.

FIG. 10 is a schematic circuit configuration diagram illustrating an example of a refrigerant circuit configuration of an air-conditioning apparatus 200 according to Embodiment 2 of the present invention. The air-conditioning apparatus 200 will be explained with reference to FIG. 10. In Embodiment 2, differences from Embodiment 1 will be mainly explained and explanation of the same portions as those in Embodiment 1, such as a refrigerant circuit configuration, will be omitted. Furthermore, since each operation mode executed by the air-conditioning apparatus 200 is similar to that performed by the air-conditioning apparatus 100 according to Embodiment 1, an explanation of the operation mode executed by the air-conditioning apparatus 200 will be omitted.

The heat transfer areas of the intermediate heat exchangers 9a and 9b within the relay unit B of the air-conditioning apparatus 200 are different from those of the air-conditioning apparatus 100 illustrated in FIGS. 1 and 2. For example, by setting the heat transfer area of the intermediate heat exchanger 9b to the heat transfer area of the intermediate heat exchanger 9a to 2:1, an intermediate heat exchanger 9b having a larger heat transfer area can be used as an evaporator and an intermediate heat exchanger 9a having a smaller heat transfer area can be used as a condenser during a cooling main operation, and an intermediate heat exchanger 9b having a larger heat transfer area can be used as a condenser and an intermediate heat exchanger 9a having a smaller heat transfer area can be used as an evaporator during a heating main operation. With this configuration, the ratio of the heat exchange capacities of the intermediate heat exchangers can be made closer to the load ratio of the indoor units C to E, thereby efficiently improving the capacity of a cooling and heating simultaneous operation. Since the control method is similar to that in Embodiment 1, an explanation of the control method will be omitted.

As described above, with the air-conditioning apparatus 200 according to Embodiment 2, operation is performed in such a manner that the control target value for the compressor suction pressure at the time of a cooling main operation is set equal to or lower than that at the time of a cooling operation and the control target value for the compressor discharge pressure at the time of a heating main operation is set equal to or higher than that at the time of a heating operation, thereby improving the efficiency and increasing the heating capacity in the individual operation modes. Therefore, similar to the air-conditioning apparatus 100 according to Embodiment 1, with the air-conditioning apparatus 200, even if the load conditions change, the cooling and heating capacities can be maintained, and operation in a state where the efficiency of cycle, such as COP, is high can be achieved.

Embodiment 3

Figure 11:
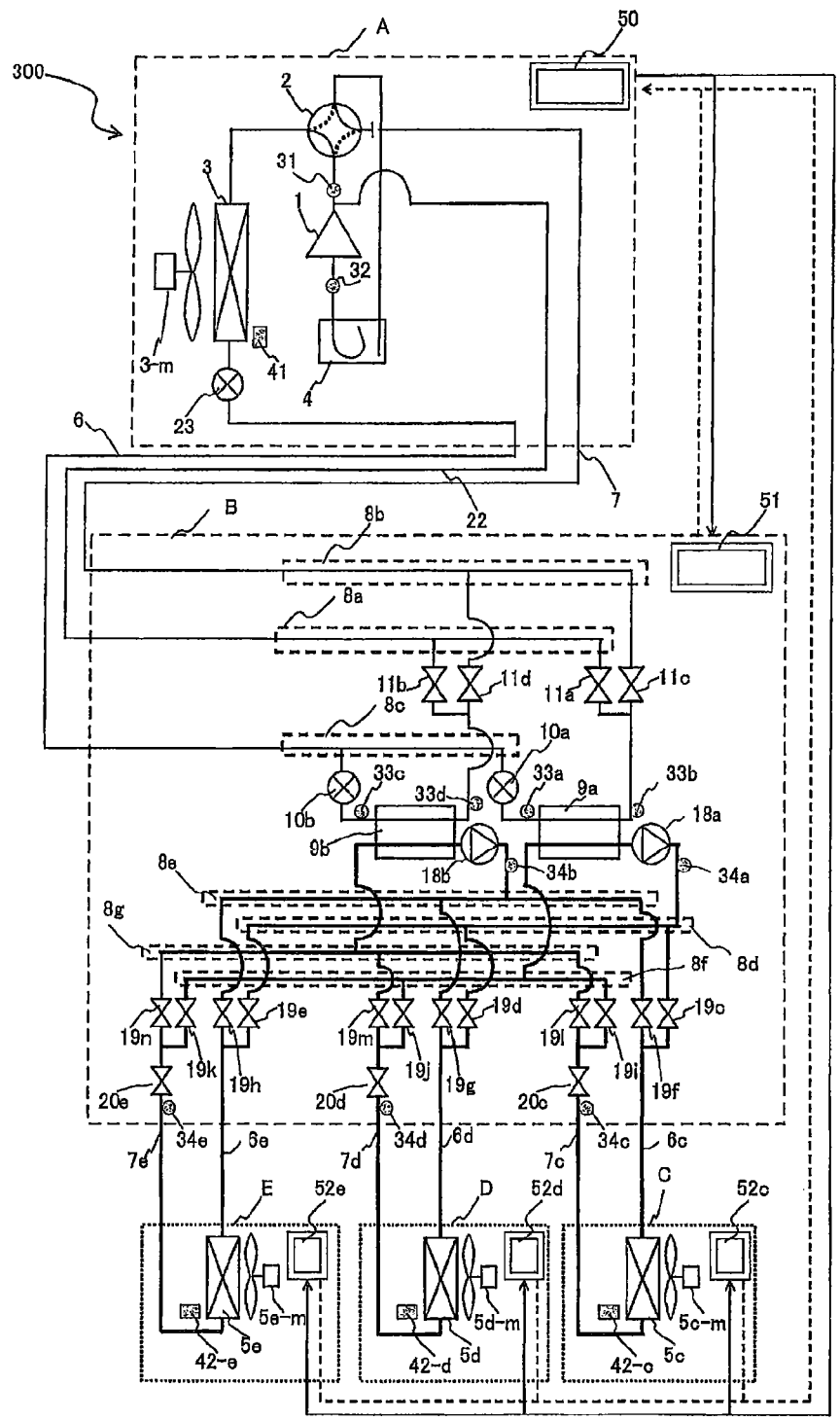
FIG. 11 is a schematic circuit configuration diagram illustrating an example of a refrigeration cycle configuration of an air-conditioning apparatus according to Embodiment 3 of the present invention.

FIG. 11 is a schematic circuit configuration diagram illustrating an example of a refrigerant circuit configuration of an air-conditioning apparatus 300 according to Embodiment 3 of the present invention. The air-conditioning apparatus 300 will be explained with reference to FIG. 11. In Embodiment 2, differences from Embodiment 1 described above will be mainly explained and an explanation of the same portions as those in Embodiment 1, such as a refrigerant circuit configuration, will be omitted. Furthermore, since each operation mode executed by the air-conditioning apparatus 300 is similar to that executed by the air-conditioning apparatus 100 according to Embodiment 1, an explanation of the operation mode will be omitted.

The air-conditioning apparatus 300 is different from the air-conditioning apparatus 100 illustrated in FIGS. 1 and 2 in that the number of pipes connecting the heat source unit A and the relay unit B together is changed from 2 into 3. In the air-conditioning apparatus 300, a third refrigerant pipe 22 is installed so that a discharge pipe of the compressor 1 in the heat source unit A and the first branch portion 8a in the relay unit B are connected together. In the air-conditioning apparatus 300, the first refrigerant pipe 6 is connected to the third branch portion 8c, and a fifth flow control device 23 for adjusting the flow rate of refrigerant flowing into the heat-source-side heat exchanger 3 is installed between the heat-source-side heat exchanger 3 and the first refrigerant pipe 6. The air-conditioning apparatus 300 is different from the air-conditioning apparatus 100 in that in the case where there is an indoor unit performing heating, a refrigerant discharged from the compressor 1 passes through the third refrigerant pipe 22 and is supplied to the intermediate heat exchangers 9a and 9b.

Furthermore, in the case where the heat-source-side heat exchanger 3 operates as a condenser, a thermometer is installed between the heat-source-side heat exchanger 3 and the fifth flow control device 23, and the fifth flow control device 23 is controlled such that, for example, the degree of subcooling stays constant based on the difference from the condensing temperature calculated from the discharge pressure of the compressor 1, and in the case where the heat-source-side heat exchanger 3 operates as an evaporator, a thermometer is installed between the heat-source-side heat exchanger 3 and the four-way valve 2, and the fifth flow control device 23 is controlled such that, for example, the degree of superheat stays constant based on the difference from the evaporating temperature calculated from the suction pressure of the compressor 1. The other flow of refrigerant is substantially the same as the flow explained using FIGS. 3 to 7 in Embodiment 1. Therefore, an explanation of the flow will be omitted.

Furthermore, since control is performed in the same way as in Embodiment 1, an explanation thereof will be omitted. With the configuration described above, by controlling the compressor suction pressure at the time of a cooling and heating simultaneous operation to be lower than that at the time of a cooling operation and controlling the discharge pressure at the time of the cooling and heating simultaneous operation to be lower than that at the time of a heating operation as in Embodiments 1 and 2, operation can be performed in a high-efficiency state during a cooling operation and a heating operation, and at the same time, the cooling and heating capacities may be maintained high during a cooling and heating simultaneous operation.

As described above, with the air-conditioning apparatus 300 according to Embodiment 3, operation is performed in such a manner that the control target value for the compressor suction pressure at the time of a cooling main operation is set equal to or lower than that at the time of a cooling operation and the control target value for the compressor discharge pressure at the time of a heating main operation is set equal to or higher than that at the time of a heating operation, thereby improving the efficiency and increasing the heating capacity in the individual operation modes. Thus, with the air-conditioning apparatus 300, similar to the air-conditioning apparatus 100 according to Embodiment 1, even if the load conditions change, the cooling and heating capacities can be maintained, and operation in the state where the efficiency of cycle, such as a COP, is high can be achieved.

Although the cases where three indoor units are provided have been explained in Embodiments 1 to 3 as examples, any number of indoor units may be connected. In addition, the cases where two intermediate heat exchangers are provided have been explained as example. However, obviously, the number of intermediate heat exchangers provided is not necessarily two. Any number of intermediate heat exchangers may be provided as long as the intermediate heat exchangers are configured to be capable of cooling and/or heating a heat medium and as long as control is performed such that the number of intermediate heat exchangers operating as evaporators during a cooling operation is greater than the number of intermediate heat exchangers operating as evaporators during a cooling main operation and that the number of intermediate heat exchangers operating as condensers during a heating operation is greater than the number of intermediate heat exchangers operating as condensers during a heating main operation. Furthermore, since the distribution performance of a heat exchanger decreases as the flow rate of refrigerant decreases, control may be performed such that a given upper limit value is specified for the number of intermediate heat exchangers to operate as condensers or condensers in accordance with the load of indoor units. Furthermore, each of the number of the first pumps 18a provided and the number of the second pumps 18b provided is not necessarily one. A plurality of small-capacity pumps may be connected in series or in parallel. Furthermore, although the cases where the accumulator 4 is included have been explained in Embodiments 1 to 3, the accumulator 4 is not necessarily provided.

REFERENCE SIGNS LIST

1: compressor, 2: four-way valve, 3: heat-source-side heat exchanger, 3-m: flow control device (fan), 4: accumulator, 5: indoor heat exchanger, 5c: indoor heat exchanger, 5d: indoor heat exchanger, 5e: indoor heat exchanger, 5-m: flow control device (fan), 5c-m: fan, 5d-m: fan, 5c-m: fan, 6: first refrigerant pipe, 6c: first brine pipe, 6d: first brine pipe, 6e: first brine pipe, 7: second refrigerant pipe, 7c: second brine pipe, 7c: second brine pipe, 7d: second brine pipe, 7e: second brine pipe, 8a: first branch portion, 8b: second branch portion, 8c: third branch portion, 8d: fourth branch portion, 8e: fifth branch portion, 8f: sixth branch portion, 8g: seventh branch portion, 9a: intermediate heat exchanger, 9b: intermediate heat exchanger, 10a: first flow control device, 10b: second flow control device, 11a: first solenoid valve, 11b: second solenoid valve, 11c: third solenoid valve, 11d: fourth solenoid valve, 12a: third flow control device, 12b: fourth flow control device, 13: refrigerant-refrigerant heat exchanger, 14: check valve, 15: check valve, 16: check valve, 17: check valve, 18a: first pump, 18b: second pump, 19c: switching valve, 19d: switching valve, 19e: switching valve, 19f: switching valve, 19g: switching valve, 19h: switching valve, 19i: switching valve, 19j: switching valve, 19k: switching valve, 19l: switching valve, 19m: switching valve, 19n: switching valve, 20c: flow control device: 20d: flow control device, 20e: flow control device, 21a: flow passage switching valve, 21b: flow passage switching valve, 22: third refrigerant pipe, 23: fifth flow control device, 31: pressure gauge, 32: pressure gauge, 33a: thermometer, 33b: thermometer, 33c: thermometer, 33d: thermometer, 33e: thermometer, 34a: thermometer, 34b: thermometer, 34c: thermometer, 34d: thermometer, 34e: thermometer, 41: thermometer, 42c: thermometer, 42d: thermometer, 42e: thermometer, 50: control means, 51: control means, 52c: control means, 52d: control means, 52e: control means, 52c: control means, 52d: control device, 60a: first connecting pipe, 60b: second connecting pipe, 100: air-conditioning apparatus, 200: air-conditioning apparatus, 300: air-conditioning apparatus, A: heat source unit, B: relay unit, C: indoor unit, D: indoor unit, E: indoor unit.

The invention claimed is:

1. An air-conditioning apparatus comprising:
a heat source unit including a compressor, a first flow passage switching valve that switches a flow passage of a first refrigerant, wherein the heat source unit also includes a heat-source-side heat exchanger;
a plurality of indoor units each including a use-side heat exchanger;
a relay unit including a plurality of intermediate heat exchangers each of which is operable in either a condenser mode or an evaporator mode, second flow passage switching valves that switch operation of the indoor units between heating and cooling, and third flow passage switching valves that switch connection of the intermediate heat exchangers between the condenser mode and the evaporator mode,
the air-conditioning apparatus including a primary-side cycle through which a primary-side heat transfer medium circulates between the heat source unit and the relay unit, and a secondary-side cycle through which a secondary-side heat transfer medium circulates between the relay unit and the indoor units, wherein heat exchange is performed between the primary-side cycle and the secondary-side cycle in the intermediate heat exchangers,
wherein when all of operating indoor units out of the plurality of indoor units are performing a cooling operation, the third flow passage switching valves are controlled such that the number of the intermediate heat exchangers operating as evaporators is greater than in a cooling main operation in which, out of said plurality of indoor units, an indoor unit performing cooling and an indoor unit performing heating exist at the same time and the first flow passage switching valve is controlled so that the heat-source-side heat exchanger operates by being connected to a discharge side of the compressor; and
control means for controlling a frequency of the compressor and a capacity of the heat-source-side heat exchanger such that, during the cooling main operation, a target value for a suction pressure or an evaporating temperature at the compressor is set lower than the target value for the suction pressure or the evaporating temperature at the compressor in a case where all of the operating indoor units are performing the cooling operation.

2. The air-conditioning apparatus of claim 1,
wherein a difference in a load capacity between cooling and heating modes of the indoor units is different from a difference in a heat exchange capacity between cooling and heating modes of the intermediate heat exchangers.

3. The air-conditioning apparatus of claim 1,
wherein the number of the indoor units connected to the relay unit is greater than the number of the intermediate heat exchangers.

4. The air-conditioning apparatus of claim 1,
wherein the target value for the suction pressure or the evaporating temperature in the cooling main operation is determined based on the target value for the suction pressure or the evaporating temperature when all of the operating indoor units are performing the cooling operation, capacities of the intermediate heat exchangers, and heat exchange capacities of the indoor units performing the cooling operation.

5. The air-conditioning apparatus of claim 1,
wherein the target value for the suction pressure, a discharge pressure, the evaporating temperature, or a condensing temperature in the cooling main operation is set based on an output value of a pump that drives the secondary-side heat transfer medium in the secondary-side cycle.

6. The air-conditioning apparatus of claim 1,
wherein a control target value for the secondary-side cycle is set in accordance with heat exchange capacities and operation modes of the indoor units, and a control target value for the primary-side cycle is set to be equivalent to the control target value for the secondary-side cycle.

7. The air-conditioning apparatus of claim 1,
wherein both in a case where at least one of the intermediate heat exchangers operates as an evaporator and in a case where at least one of the intermediate heat exchangers operates as a condenser, a flow of the secondary-side heat transfer medium is operable so that a flow of the primary-side heat transfer medium and the flow of the secondary-side heat transfer medium are opposed to each other.

8. The air-conditioning apparatus of claim 1,
wherein the intermediate heat exchangers have different heat transfer areas, and the intermediate heat exchangers serve as evaporators or condensers in accordance with a heat exchange capacity and an operation mode.

9. An air-conditioning apparatus comprising:
a heat source unit including a compressor, a first flow passage switching valve that switches a flow passage of a first refrigerant, wherein the heat source unit also includes a heat-source-side heat exchanger;
a plurality of indoor units each including a use-side heat exchanger; and
a relay unit including a plurality of intermediate heat exchangers each of which is operable in either a condenser mode or an evaporator mode, second flow passage switching valves that switch operation of the indoor units between heating and cooling, and third flow passage switching valves that switch connection of the intermediate heat exchangers between the condenser mode and the evaporator mode,
the air-conditioning apparatus including a primary-side cycle through which a primary-side heat transfer medium circulates between the heat source unit and the relay unit, and a secondary-side cycle through which a secondary-side heat transfer medium circulates between the relay unit and the indoor units, wherein heat exchange is performed between the primary-side cycle and the secondary-side cycle in the intermediate heat exchangers,
wherein when all of operating indoor units out of the plurality of indoor units are performing a heating operation,
the third flow passage switching valves are controlled such that the number of the intermediate heat exchangers operating as condensers is greater than in a heating main operation in which, out of said plurality of indoor units, an indoor unit performing cooling and an indoor unit performing heating exist at the same time and the first flow passage switching valve is controlled so that the heat-source-side heat exchanger operates by being connected to a suction side of the compressor; and
control means for controlling a frequency of the compressor and a capacity of the heat-source-side heat exchanger such that, during the heating main operation, a target value for a discharge pressure or a condensing temperature at the compressor is set higher than the target value for the discharge pressure or the condensing temperature at the compressor in a case where all of the operating indoor units are performing the heating operation.

10. The air-conditioning apparatus of claim 9,
wherein the target value for the discharge pressure or the condensing temperature in the heating main operation is determined based on the target value for the discharge pressure or the condensing temperature when all of the operating indoor units are performing the heating operation, capacities of the intermediate heat exchangers, and heat exchange capacities of the indoor units performing the heating operation.

11. The air-conditioning apparatus of claim 9,
wherein the target value for a suction pressure, the discharge pressure, an evaporating temperature, or the condensing temperature in the heating main operation is set based on an output value of a pump that drives the secondary-side heat transfer medium in the secondary-side cycle.

12. The air-conditioning apparatus of claim 9,
wherein a difference in a load capacity between cooling and heating modes of the indoor units is different from a difference in a heat exchange capacity between cooling and heating modes of the intermediate heat exchangers.

13. The air-conditioning apparatus of claim 9,
wherein the number of the indoor units connected to the relay unit is greater than the number of the intermediate heat exchangers.

14. The air-conditioning apparatus of claim 9,
wherein a control target value for the secondary-side cycle is set in accordance with heat exchange capacities and operation modes of the indoor units, and a control target value for the primary-side cycle is set to be equivalent to the control target value for the secondary-side cycle.

15. The air-conditioning apparatus of claim 9,
wherein both in a case where at least one of the intermediate heat exchangers operates as an evaporator and in a case where at least one of the intermediate heat exchangers operates as a condenser, a flow of the secondary-side heat transfer medium is operable so that a flow of the primary-side heat transfer medium and the flow of the secondary-side heat transfer medium are opposed to each other.

16. The air-conditioning apparatus of claim 9, wherein the intermediate heat exchangers have different heat transfer areas, and the intermediate heat exchangers serve as evaporators or condensers in accordance with a heat exchange capacity and an operation mode.

* * * * *